(12) United States Patent
Chen et al.

(10) Patent No.: US 12,456,914 B2
(45) Date of Patent: Oct. 28, 2025

(54) CONTROL DEVICE

(71) Applicant: CHIP-GAN POWER SEMICONDUCTOR CORPORATION, Hsinchu (TW)

(72) Inventors: Ke-Horng Chen, Hsinchu (TW); Ying-Feng Wu, Hsinchu (TW); Yu-Chou Ko, Hsinchu (TW); Kuo-Lin Zheng, Hsinchu (TW); Ke-Ming Su, Hsinchu (TW)

(73) Assignee: Chip-GaN Power Semiconductor Corporation, Hsinchu (TW)

( * ) Notice: Subject to any disclaimer, the term of this patent is extended or adjusted under 35 U.S.C. 154(b) by 202 days.

(21) Appl. No.: 18/492,976

(22) Filed: Oct. 24, 2023

(65) Prior Publication Data

US 2025/0047189 A1   Feb. 6, 2025

(30) Foreign Application Priority Data

Aug. 2, 2023   (TW) ................................. 112128991

(51) Int. Cl.
*H02M 1/08* (2006.01)
*H02M 1/00* (2006.01)
*H02M 3/335* (2006.01)

(52) U.S. Cl.
CPC ........... *H02M 1/08* (2013.01); *H02M 1/0012* (2021.05); *H02M 3/33592* (2013.01)

(58) Field of Classification Search
CPC ... H02M 1/08; H02M 1/0012; H02M 3/33592
See application file for complete search history.

(56) References Cited

U.S. PATENT DOCUMENTS

| 11,996,763 B2 * | 5/2024 | Maruyama ............ H02M 1/007 |
| 2014/0133186 A1 * | 5/2014 | Balakrishnan .......... H01L 23/48 |
| | | 363/17 |

(Continued)

OTHER PUBLICATIONS

Shu-Yung Lin; "A Monolithic GaN Driver with On-chip Adaptive On-time Controller and Negative Current Slope Detector to Prevent the Shoot-through effect caused by GaN process defects in Flyback Converter" (Oct. 25, 2022).

(Continued)

*Primary Examiner* — Adolf D Berhane
(74) *Attorney, Agent, or Firm* — Rosenberg, Klein & Lee

(57) ABSTRACT

A control device includes a first capacitor, a drive controller, a constant current source, a discharge-controlled current source, a current mirror, and a sample-and-hold circuit. The constant current source generates a constant current. The discharge-controlled current source is coupled to the constant current source and the first capacitor. The current mirror is coupled to the first capacitor and the primary side of a primary-side switch. The current mirror generates a copy current, thereby generating a copy voltage across the first capacitor. When the drive controller turns on the primary-side switch, the sample-and-hold circuit drives the discharge-controlled current source to sample and hold a control current from the constant current and the copy current. When the node voltage is higher than the copy voltage, the comparison circuit drives the drive controller to turn off the primary-side switch.

12 Claims, 14 Drawing Sheets

(56) References Cited

U.S. PATENT DOCUMENTS

2015/0229201 A1* 8/2015 Lee .................. H02M 3/3376
363/21.02
2023/0246558 A1* 8/2023 Radic .................. H02M 3/01

OTHER PUBLICATIONS

Shu-Yung Lin et al. "A GaN Gate Driver with On-chip Adaptive On-time Controller and Negative Current Slope Detector" (Feb. 21, 2023); Presented at IEEE.

* cited by examiner

CONTROL DEVICE

This application claims priority for the TW patent application No. 112128991 filed on 2 Aug. 2023, the content of which is incorporated by reference in its entirely.

BACKGROUND OF THE INVENTION

Field of the Invention

The invention relates to an electrical device, particularly to a control device coupled to a primary-side switch.

Description of the Related Art

Monolithic gallium nitride (GaN) solutions are widely used in high power density applications, due to low on-resistance and low parasitic capacitance. However, some process defects, such as current collapse, kink effects, and self-heating, will degrade the $I_{DS}$-$V_{DS}$ curve of high GaN devices, which can lead to efficiency degradation and power device damage. Current collapse will increase on-resistance, which will cause the GaN to heat up causing self-heating, and the drain current drops significantly when GaN enters the saturation region. Furthermore, the kink effect induced by hot electrons trapped by donor-like traps through the GaN buffer will induce a negative slope in the triode region, which may lead to blurred transitions from the triode region to the saturation region. Thus, if the detection of saturation is inaccurate, the sudden change from the kink effect to self-heating will limit the current driving capability. Consequently, in flyback converters, part of the inductor current will leak to the secondary side when the primary side GaN is still turned on, resulting in serious shoot-through effects.

FIG. 1 is a diagram schematically illustrating a conventional flyback power converter. FIG. 2 is a diagram schematically illustrating the curves of a primary-side current and a node voltage in the conventional technology. FIG. 3 is a diagram schematically illustrating the waveforms of voltages and currents in FIG. 1. Please refer to FIG. 1, FIG. 2, and FIG. 3. In the continuous mode (CCM), a primary-side gate control voltage $V_{GPRI}$ will normally turn on a primary-side switch 10 at $T_0$ and turn off the primary-side switch 10 at $T_1$. After the deadtime period finishes, a secondary-side gate control voltage $V_{GSEC}$ turns off a synchronous switch 11. A transformer 12 receives an input voltage $V_{IN}$ to generate an output voltage $V_{OUT}$. The primary-side switch 10 is implemented with a GaN transistor and controlled by a primary-side controller 13. The secondary side of the transformer 12 is coupled to a synchronous controller 15 through two comparators 14. The synchronous controller 15 controls the synchronous switch 11. The comparators 14 are coupled to reference voltages $V_{REF}$. The curves of the primary-side current $I_{PRI}$ of the primary-side switch 10 versus a node voltage $V_D$ is shown in FIG. 2. The curves from top to bottom respectively correspond to different states that include the normal state, the current collapse, the kink effect, and the self-heating state. In FIG. 3, a dashed line represents a normal waveform, a solid line represents the waveforms of the kink effect and the self-heating state, a cross-sectional line represents energy loss. Unfortunately, as kink effect and trapping effects occur, the node voltage $V_D$ increases substantially from $V_{D1}$ to $V_{D2}$, reducing the drive capability of the primary-side switch 10. When the node voltage $V_D$ of the primary-side switch 10 exceeds $V_{D2}$ at $T_1$, self-heating occurs, which will severely reduce the drive current capability and the primary-side current $I_{PRI}$, resulting in the generation of undesired snubber current $I_{SN}$. For example, the node voltage $V_D$ of the primary-side switch 10 is equal to $V_{D3}$ as the current reversal point at $T_1$. Hence, the forward-biased voltage $V_{forward}$ of the secondary side will be lower than the ground voltage and turn on the synchronous switch 11, which will induce the leakage current $I_{sec}$. When the primary-side gate control voltage $V_{GPRI}$ is a high-level voltage that turns on the primary-side switch 10, the leakage current $I_{sec}$ will cause shoot-through problems and reduce the overall efficiency. Although the current collapse issue is reduced through a well-controlled bootstrapping technique, they all fail to address the kink effects and self-heating issues.

To overcome the abovementioned problems, the invention provides a control device, so as to solve the afore-mentioned problems of the prior art.

SUMMARY OF THE INVENTION

The invention provides a control device, which avoids the shoot-through phenomena of a primary-side switch.

In an embodiment of the invention, the control device is coupled to the control terminal of a primary-side switch. The primary-side switch is coupled to the primary side of a first transformer in series. The control device includes a first capacitor, a drive controller, a constant current source, a discharge-controlled current source, a current mirror, a sample-and-hold circuit, and a comparison circuit. The drive controller is coupled to the control terminal of the primary-side switch. The constant current source is coupled to the first capacitor and configured to generate a constant current. The discharge-controlled current source is coupled to the constant current source and the first capacitor. The current mirror is coupled to a node between the first capacitor and the primary side of the primary-side switch and configured to generate a copy current based on the node voltage of the node. The copy current is configured to charge the first capacitor to generate a copy voltage across the first capacitor. The sample-and-hold circuit is coupled to the drive controller, the discharge-controlled current source, and the current mirror. When the drive controller turns on the primary-side switch, the sample-and-hold circuit drives the discharge-controlled current source to sample and hold a control current from the constant current and the copy current. The comparison circuit is coupled to the drive controller, the sample-and-hold circuit, the node, and the first capacitor and coupled to the node voltage and the copy voltage. When the node voltage is higher than the copy voltage, the comparison circuit drives the drive controller to turn off the primary-side switch.

In an embodiment of the invention, the sample-and-hold circuit includes a delayer, a an N-channel SR flip-flop, metal-oxide-semiconductor field-effect transistor (NMOSFET), and a second capacitor. The delayer is coupled to the drive controller. The S input of the SR flip-flop is coupled to the drive controller and the R input of the SR flip-flop is coupled to the delayer. The gate of the NMOSFET is coupled to the Q output of the SR flip-flop. The NMOSFET is coupled between the current mirror and the discharge-controlled current source. One terminal of the second capacitor is coupled to the NMOSFET and the discharge-controlled current source and another terminal of the second capacitor is coupled to a reference voltage.

In an embodiment of the invention, the comparison circuit includes an offset voltage source, a comparator, and an AND gate. The negative terminal of the offset voltage source is coupled to the first capacitor and the current mirror. The negative input of the comparator is coupled to the positive terminal of the offset voltage source. The positive input of the comparator is coupled to the node. The input of the AND gate is coupled to the output of the comparator and the Q output of the SR flip-flop. The output of the AND gate is coupled to the drive controller.

In an embodiment of the invention, the control device further includes a maximum allowed switching frequency controller. The secondary side of the first transformer is coupled to a synchronous rectifier. The synchronous rectifier is coupled to a secondary controller. The secondary controller is coupled to the primary side of a second transformer. The secondary side of the second transformer is configured to generate an ask voltage. The maximum allowed switching frequency controller is coupled to the drive controller, the secondary side of the second transformer, and the control terminal of the primary-side switch and coupled to the ask voltage, thereby driving the drive controller to limit the maximum frequency of the primary-side switch.

In an embodiment of the invention, the maximum allowed switching frequency controller includes a first inverter, a first SR flip-flop, a second SR flip-flop, an AND gate, a clock generator, a second inverter, and a third SR flip-flop. The S input of the first SR flip-flop is coupled to the secondary side of the second transformer and coupled to the ask voltage. The R input of the first flip-flop is coupled to the control terminal of the primary-side switch. The S input of the second SR flip-flop is coupled to the comparison circuit and the R input of the second SR flip-flop is coupled to an output of the first inverter. The input of the AND gate is coupled to the Q output of the first SR flip-flop and the $\overline{Q}$ output of the second SR flip-flop. The output of the AND gate is coupled to the drive controller. The clock generator is coupled to a supply voltage and a reference voltage and coupled to an input of the first inverter. The input of the second inverter is coupled to the clock generator and the input of the first inverter. The S input of the third SR flip-flop is coupled to the control terminal of the primary-side switch. The R input of the third SR flip-flop is coupled to the output of the second inverter. The $\overline{Q}$ output of the third SR flip-flop is coupled to the clock generator.

In an embodiment of the invention, the clock generator includes a first N-channel metal-oxide-semiconductor field-effect transistor (NMOSFET), a first control capacitor, a second N-channel metal-oxide-semiconductor field-effect transistor (NMOSFET), a first depletion-mode N-channel metal-oxide-semiconductor field-effect transistor (NMOSFET), a second depletion-mode N-channel metal-oxide-semiconductor field-effect transistor (NMOSFET), and a third N-channel metal-oxide-semiconductor field-effect transistor (NMOSFET). The gate of the first NMOSFET is coupled to the Q output of the third SR flip-flop. The source of the first NMOSFET is coupled to the reference voltage. One terminal of the first control capacitor is coupled to the reference voltage and another terminal of the first control capacitor is coupled to the drain of the first NMOSFET. The source of the second NMOSFET is coupled to the first control capacitor and the drain of the first NMOSFET. The source of the first depletion-mode NMOSFET is coupled to the drain and the gate of the second NMOSFET and the gate of the first depletion-mode NMOSFET through a first resistor. The drain of the first depletion-mode NMOSFET is coupled to the supply voltage. The drain of the second depletion-mode NMOSFET is coupled to the supply voltage. The source of the second depletion-mode NMOSFET is coupled to the inputs of the first inverter and the second inverter and the gate of the second depletion-mode NMOS-FET through a second resistor. The gate of the third NMOSFET is coupled to the gate of the second NMOSFET. The drain of the third NMOSFET is coupled to the second resistor, the gate of the second depletion-mode NMOSFET, and the inputs of the first inverter and the second inverter. The source of the third NMOSFET is coupled to the reference voltage through a third resistor.

In an embodiment of the invention, the maximum frequency is equal to $(RC)^{-1}$, C represents the capacitance of the first control capacitor, and R represents the resistance of the third resistor.

In an embodiment of the invention, the control device further includes a voltage dependent controller. The first transformer further includes an auxiliary side. The primary side of the first transformer is coupled to a voltage divider and coupled to an input voltage. The voltage divider is configured to generate a dependent voltage based on the input voltage. The auxiliary side is configured to generate an auxiliary voltage. The voltage dependent controller is coupled to the drive controller, the auxiliary side, and the voltage divider and coupled to the dependent voltage and the auxiliary voltage. The voltage dependent controller is configured to generate a reset voltage based on the dependent voltage and the auxiliary voltage and transmit the reset voltage to the drive controller.

In an embodiment of the invention, the voltage dependent controller includes a duty dependent current converter, a third inverter, a fourth N-channel metal-oxide-semiconductor field-effect transistor (NMOSFET), a second control capacitor, a comparator, and a pulse generator. The duty dependent current converter is coupled to the voltage divider and the auxiliary side and coupled to the auxiliary voltage and the dependent voltage. The duty dependent current converter is configured to generate a conversion voltage based on the auxiliary voltage and the dependent voltage. The input of the third inverter is coupled to the control terminal of the primary-side switch. The gate of the fourth NMOSFET is coupled to the output of the third inverter. The source of the fourth NMOSFET is coupled to the reference voltage. The drain of the fourth NMOSFET is coupled to the duty dependent current converter and coupled to the conversion voltage. One terminal of the second control capacitor is coupled to the reference voltage and another terminal of the second control capacitor is coupled to the drain of the fourth NMOSFET and coupled to the conversion voltage. The negative terminal of the comparator is coupled to the auxiliary side and coupled to the auxiliary voltage. The positive terminal of the comparator is coupled to the duty dependent current converter and coupled to the conversion voltage. The pulse generator is coupled to the output of the comparator and drive controller and configured to generate the reset voltage.

In an embodiment of the invention, the drive controller includes an OR gate, a fourth SR flip-flop, and a driver. The input of the OR gate is coupled to the pulse generator and the comparison circuit and coupled to the reset voltage. The S input of the fourth SR flip-flop is coupled to the OR gate. The R input of the fourth SR flip-flop is coupled to the output of the OR gate. The Q output of the fourth SR flip-flop is coupled to the sample-and-hold circuit. The driver is coupled to the input of the third inverter, the Q output of the fourth SR flip-flop, the control terminal of the primary-side switch, the R input of the first SR flip-flop, and the S input of the third SR flip-flop.

In an embodiment of the invention, the driver includes a fourth inverter, a pre-driver, a fifth N-channel metal-oxide-semiconductor field-effect transistor (NMOSFET), a sixth N-channel metal-oxide-semiconductor field-effect transistor (NMOSFET), a seventh N-channel metal-oxide-semiconductor field-effect transistor (NMOSFET), an eighth N-channel metal-oxide-semiconductor field-effect transistor (NMOSFET), a diode, a first driving capacitor, a second driving capacitor, and a ninth N-channel metal-oxide-semiconductor field-effect transistor (NMOSFET). The input of the fourth inverter is coupled to the Q output of the fourth SR flip-flop. The pre-driver is coupled to the output of the fourth inverter. The fifth NMOSFET and the sixth NMOSFET are coupled in series and coupled between the supply voltage and the reference voltage. The control terminal of the primary-side switch is coupled between the fifth NMOSFET and the sixth NMOSFET. The seventh NMOSFET and the eighth NMOSFET are coupled in series and coupled between the gate of the fifth NMOSFET and the supply voltage.

The eighth NMOSFET is coupled to the pre-driver. The anode of the diode is coupled to the supply voltage. The cathode of the diode is coupled to the gate of the seventh NMOSFET. One terminal of the first driving capacitor is coupled to the gate of the seventh NMOSFET and another terminal of the first driving capacitor is coupled to the output of the fourth inverter. One terminal of the second driving capacitor is coupled between the seventh NMOSFET and the eighth NMOSFET and another terminal of the second driving capacitor is coupled to the control terminal of the primary-side switch. The ninth NMOSFET is coupled between the gate of the fifth NMOSFET and the reference voltage. The gates of the ninth NMOSFET and the sixth NMOSFET are coupled to the output of the fourth inverter.

In an embodiment of the invention, the control device further includes a depletion-mode N-channel metal-oxide-semiconductor field-effect transistor (NMOSFET) with one terminal thereof coupled to the comparison circuit and the current mirror. The depletion-mode NMOSFET is coupled between the node and the comparison circuit and the depletion-mode NMOSFET is turned on.

To sum up, the control device employs the sample-and-hold circuit to record the rising slope of the copy voltage across the first capacitor, thereby turning off the primary-side switch. Thus, the shoot-through phenomenon of the primary-side switch is avoided.

Below, the embodiments are described in detail in cooperation with the drawings to make easily understood the technical contents, characteristics and accomplishments of the invention.

DETAILED DESCRIPTION OF THE INVENTION

Figure 1:
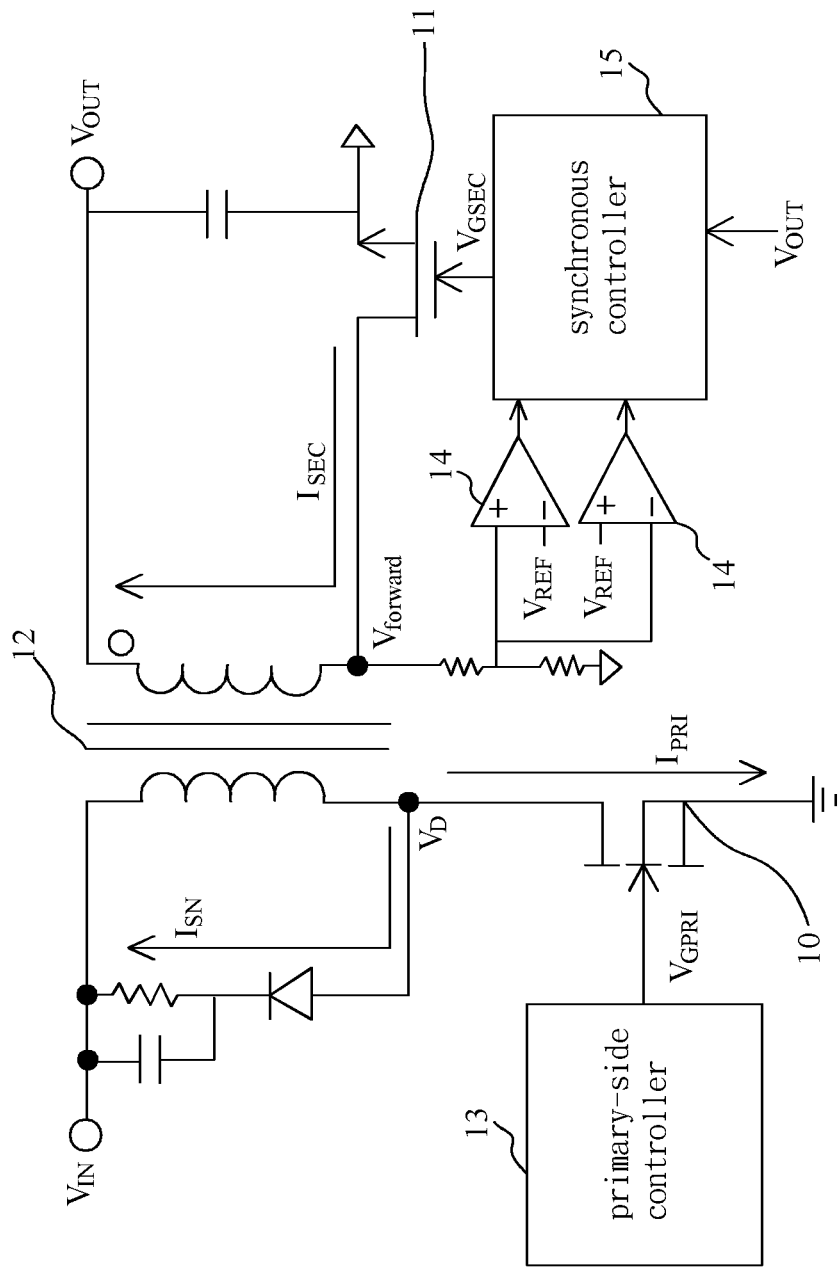
FIG. 1 is a diagram schematically illustrating a conventional flyback power converter.
Figures 2, 3:
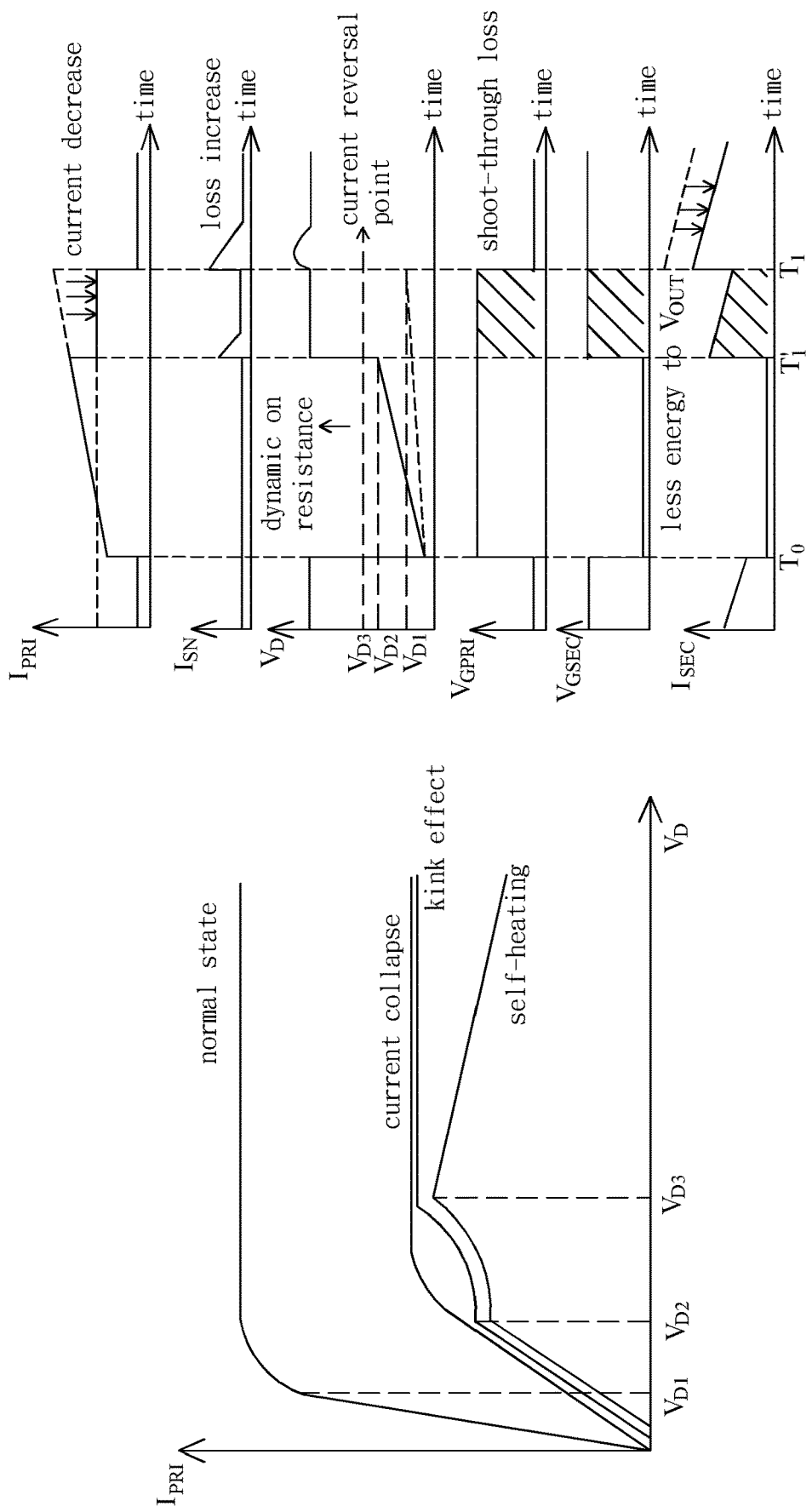
FIG. 2 is a diagram schematically illustrating the curves of a primary-side current and a node voltage in the conventional technology.
FIG. 3 is a diagram schematically illustrating the waveforms of voltages and currents in FIG. 1.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express what the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to using different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to encompass any indirect or direct connection. Accordingly, if this disclosure mentions that a first device is coupled with a second device, it means that the first device may be directly or indirectly coupled to the second device through electrical connections, wireless communications, optical communications, or other signal connections with/ without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

Figure 4:
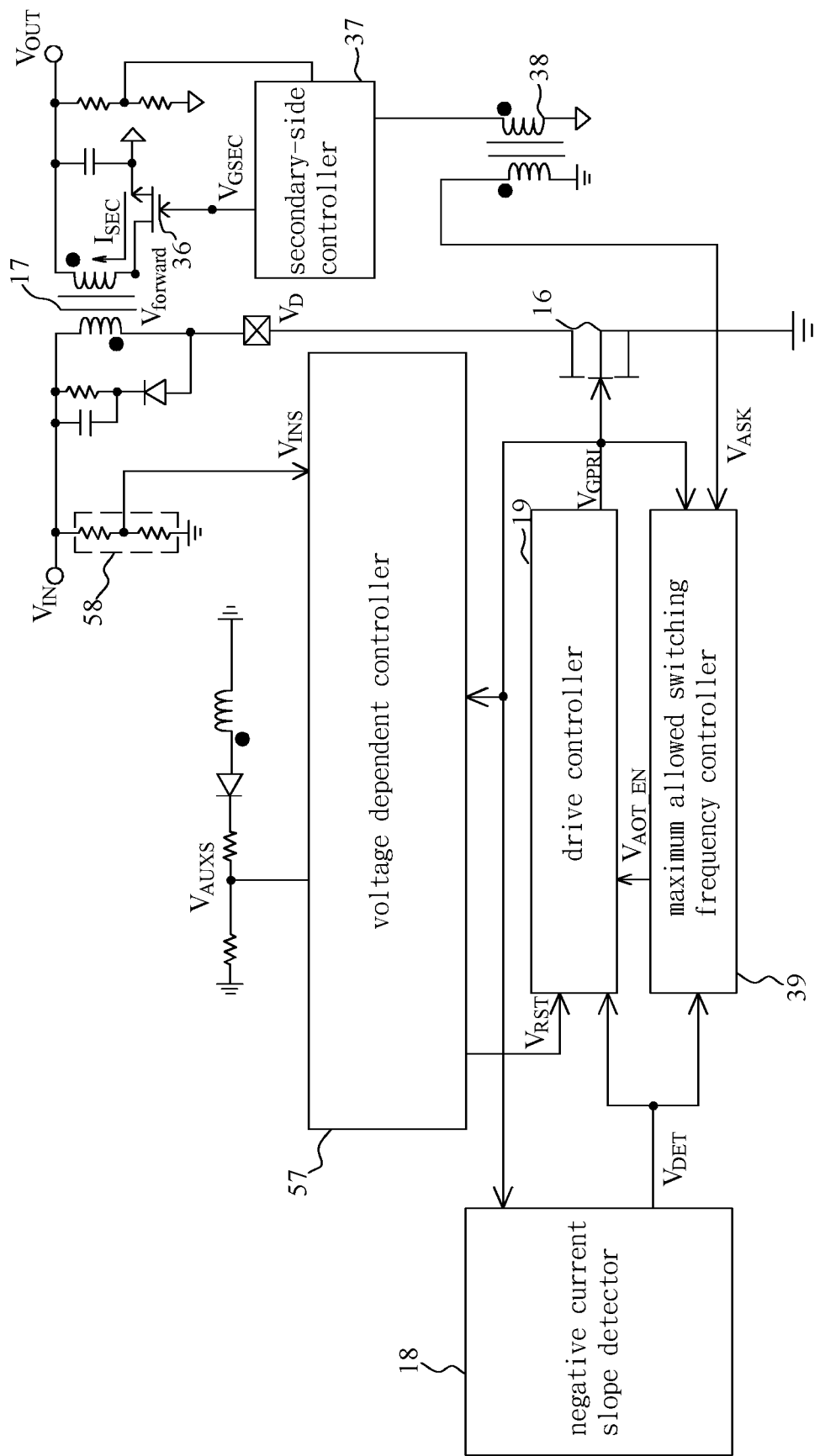
FIG. 4 is a diagram schematically illustrating a control device according to an embodiment of the invention.
Figure 5:
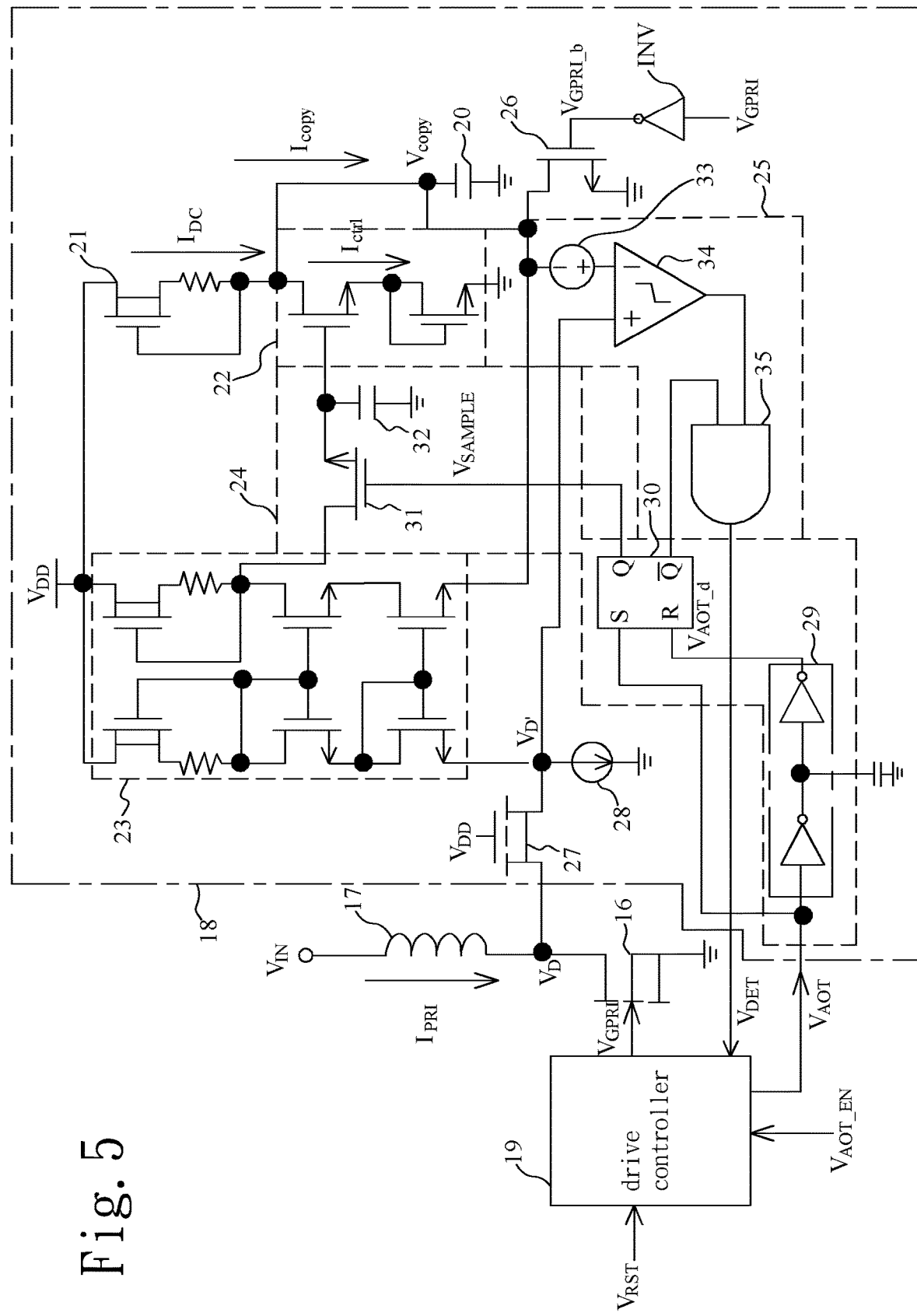
FIG. 5 is a diagram schematically illustrating a negative current slope detector and a drive controller according to an embodiment of the invention.
Figure 6:
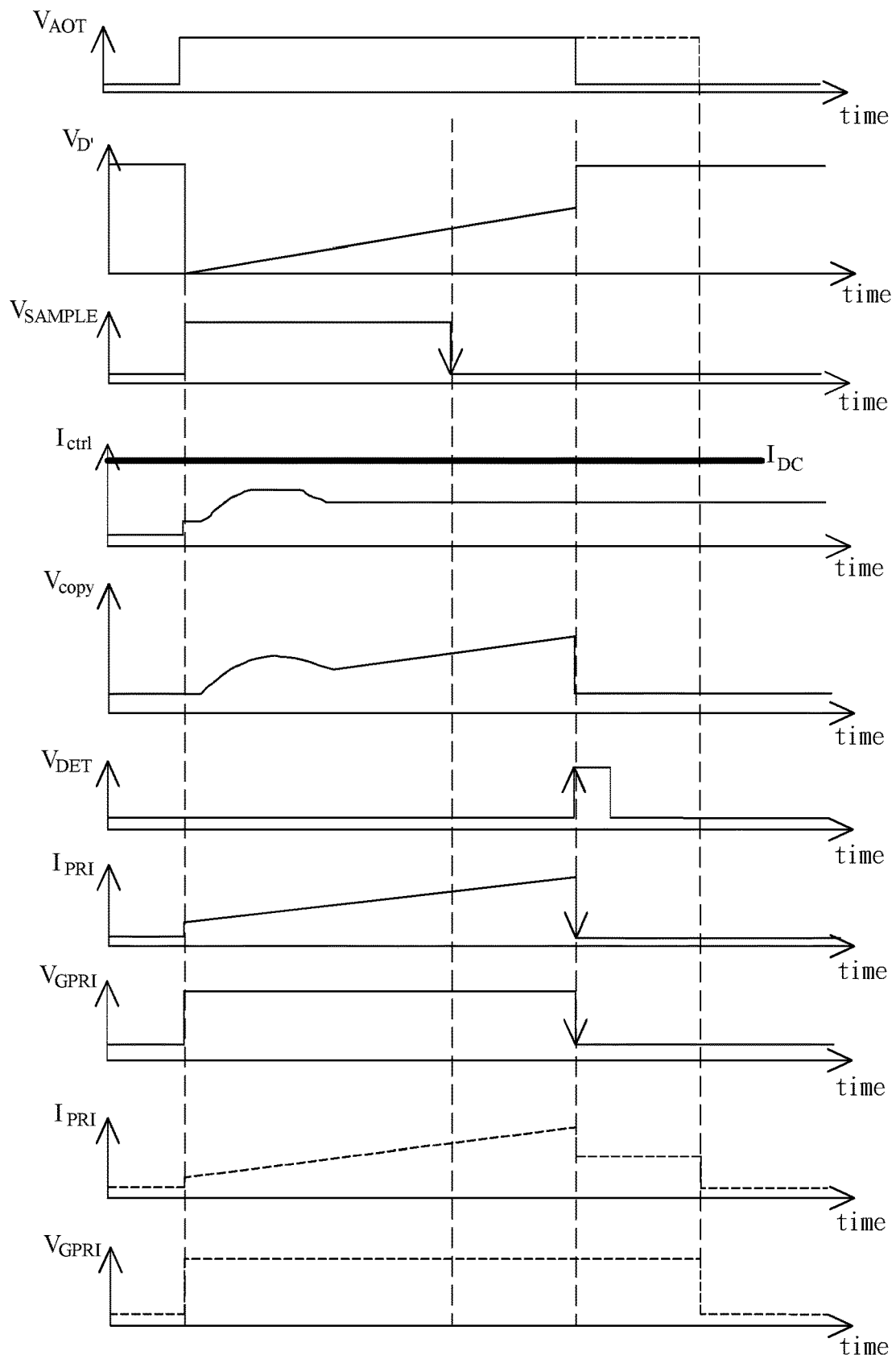
FIG. 6 is a diagram schematically illustrating the waveforms of voltages and currents corresponding to FIG. 5.

FIG. 4 is a diagram schematically illustrating a control device according to an embodiment of the invention. FIG. 5 is a diagram schematically illustrating a negative current slope detector and a drive controller according to an embodiment of the invention. FIG. 6 is a diagram schematically illustrating the waveforms of voltages and currents corresponding to FIG. 5. Referring to FIG. 4, FIG. 5, and FIG. 6, an embodiment of the control device is introduced as follows. The control device is coupled to the control terminal of a primary-side switch 16. The primary-side switch 16 is coupled to the primary side of a first transformer 17 in series. The primary-side switch 16 may be, but not limited to, an enhanced-mode gallium nitride (GaN)-based N-channel metal-oxide-semiconductor field-effect transistor (MOSFET). The base of the GaN-based MOSFET includes gallium nitride. The control device includes a negative current slope detector 18 and a drive controller 19. The negative current slope detector 18 includes a first capacitor 20, a constant current source 21, a discharge-controlled current source 22, a current mirror 23, a sample-and-hold circuit 24, and a comparison circuit 25. The constant current source 21 may include, but is not limited to, a depletion-mode GaN-based N-channel MOSFET. The discharge-controlled current source 22 may include, but is not limited to, an enhanced-mode GaN-based N-channel MOSFET. The current mirror 23 may include, but is not limited to, an enhanced-mode GaN-based N-channel MOSFET and a depletion-mode GaN-based N-channel MOSFET. The drive controller 19 is coupled to the control terminal of the primary-side switch 16. The constant current source 21 is coupled to the first capacitor 20. The discharge-controlled current source 22 is coupled to both the constant current source 21 and the first capacitor 20. The current mirror 23 is coupled to the first capacitor 20 and a node between the primary-side switch 16 and the primary side of the first transformer 17. The sample-and-hold circuit 24 is coupled to the drive controller 19, the discharge-controlled current source 22, and the current mirror 23. The comparison circuit 25 is coupled to the drive controller 19, the sample-and-hold circuit 24, the node between the primary-side switch 16 and the primary side of the first transformer 17, and the first capacitor 20. To enhance the efficiency of the control device, the control device may further include a field-effect transistor 26 and a depletion-mode N-channel MOSFET 27. The field-effect transistor 26 may be, but not limited to, an enhanced-mode GaN-based N-channel MOSFET. The depletion-mode N-channel MOSFET 27 may be, but not limited to, a depletion-mode GaN-based N-channel MOSFET. The field-effect transistor 26 is coupled to the current mirror 23, the first capacitor 20, and a reference voltage, where the reference voltage may be, for example, ground voltage, but the invention is not limited thereto. One terminal of the depletion-mode N-channel MOSFET 27 is coupled to the comparison circuit 25 and the current mirror 23, such that the common node of the depletion-mode N-channel MOSFET 27, the comparison circuit 25, and the current mirror 23 has a node voltage $V_D$. The depletion-mode N-channel MOSFET 27 is coupled between the comparison circuit 25 and the node between the primary-side switch 16 and the primary side of the first transformer 17. The current mirror 23 can be coupled to a current source 28.

The operation of the negative current slope detector 18 and the drive controller 19 is introduced as follows. The constant current source 21 is coupled to a supply voltage $V_{DD}$ to generate a constant current $I_{DC}$. The depletion-mode N-channel MOSFET 27 is coupled to the supply voltage $V_{DD}$, such that the depletion-mode N-channel MOSFET 27 is turned on. Therefore, the node voltage $V_D$ the node between the primary-side switch 16 and the primary side of the first transformer 17 is equal to the node voltage $V_{D'}$. The primary side of the first transformer 17 is coupled to an input voltage $V_{IN}$. When the primary-side switch 16 is turned on, a primary-side current $I_{PRI}$ passes through the primary side of the first transformer 17. The drive controller 19, coupled to a reset voltage $V_{RST}$ and a enable voltage $V_{AOT\_EN}$, receives a detection voltage $V_{DET}$ from the comparison circuit 25. The drive controller 19 generates a primary-side gate control voltage $V_{GPRI}$ and an adaptive on-time voltage $V_{AOT}$ in response to the reset voltage $V_{RST}$, the enable voltage $V_{AOT\_EN}$, and the detection voltage $V_{DET}$. The drive controller 19 turns on or off the primary-side switch 16 in response to the primary-side gate control voltage $V_{GPRI}$ and transmits the adaptive on-time voltage $V_{AOT}$ to the sample-and-hold circuit 24. Additionally, the control terminal of the field-effect transistor 26 is coupled to the drive controller 19 through an inverter INV and is coupled to an inverted primary-side gate control voltage $V_{GPRI\_b}$, such that the field-effect transistor 26 is turned off or on.

When the adaptive on-time voltage $V_{AOT}$ is a low-level voltage, the primary-side gate control voltage $V_{GPRI}$ is a low-level voltage, the primary-side switch 16 is turned off, and the node voltage $V_{D'}$ is a high-level voltage.

When the adaptive on-time voltage $V_{AOT}$ is a high-level voltage, the primary-side gate control voltage $V_{GPRI}$ is a high-level voltage, the primary-side switch 16 is turned on, the primary-side current $I_{PRI}$ gradually increases, and the node voltage $V_D$ gradually increases from a low-level voltage.

The current mirror 23, coupled to the supply voltage $V_{DD}$, then generates a copy current $I_{copy}$ based on the node voltage $V_D$. The copy current $I_{copy}$ charges the first capacitor 20 to form a copy voltage $V_{copy}$ across the first capacitor 20. When the drive controller 19 turns on the primary-side switch 16, the sample-and-hold circuit 24 drives the discharge-controlled current source 22 to sample and hold a control current $I_{ctrl}$ from the constant current $I_{DC}$ and the copy current $I_{copy}$, thereby recording the rising slope of the copy voltage $V_{copy}$. The rising slope of the copy voltage $V_{copy}$ is equal to the rising slope of the node voltage $V_D$ in the linear region of the primary-side switch 16 and is also equal to the copy current $I_{copy}$ divided by the capacitance of the first capacitor 20. The comparison circuit 25 is coupled to the node voltage $V_D$ and the copy voltage $V_{copy}$. If the primary-side switch 16 has a shoot-through phenomenon, the node voltage $V_D$ will be greater than the copy voltage $V_{copy}$. Therefore, when the node voltage $V_D$ is greater than the copy voltage $V_{copy}$, the detection voltage $V_{DET}$ becomes a positive pulse voltage, such that the copy voltage $V_{copy}$, the primary-side current $I_{PRI}$, the primary-side gate control voltage $V_{GPRI}$, and the adaptive on-time voltage $V_{AOT}$ abruptly drop, the node voltage $V_{D'}$ abruptly rises, and the comparison circuit 25 drives the drive controller 19 to turn off the primary-side switch 16, thereby preventing a shoot-through phenomenon from occurring in the primary-side switch 16.

In order to emphasize the effectiveness of the control device in preventing the shoot-through phenomenon from occurring in the primary side switch 16, the solid-line waveform in FIG. 6 represents the waveform with using the control device of the invention, and the dashed-line waveform in FIG. 6 represents the waveform without using the control device of the invention.

In some embodiments of the invention, the sample-and-hold circuit 24 may include a delayer 29, an SR flip-flop 30, an N-channel metal-oxide-semiconductor field-effect transistor (MOSFET) 31, and a second capacitor 32. The delayer 29 can be implemented with two inverters coupled in series, but the invention is not limited thereto. The N-channel MOSFET 31 may be, but not limited to, an enhanced-mode gallium nitride (GaN)-based N-channel MOSFET. The delayer 29 is coupled to the drive controller 19. The S input of the SR flip-flop 30 is coupled to the drive controller 19 and the R input of the SR flip-flop 30 is coupled to the delayer 29. The gate of the N-channel MOSFET 31 is coupled to the Q output of the SR flip-flop 30. The N-channel MOSFET 31 is coupled between the current mirror 23 and the discharge-controlled current source 22. One terminal of the second capacitor 32 is coupled to the N-channel MOSFET 31 and the discharge-controlled current source 22 and another terminal of the second capacitor 32 is coupled to a reference voltage. The delayer 29, coupled to the adaptive on-time voltage $V_{AOT}$, generates a delayed adaptive on-time voltage $V_{AOT\_d}$. The S and R inputs of the SR flip-flop 30 are respectively coupled to the adaptive on-time voltage $V_{AOT}$ and the delayed adaptive on-time voltage $V_{AOT\_d}$. The Q output of the SR flip-flop 30 generates a sampling voltage $V_{SAMPLE}$. The sampling voltage $V_{SAMPLE}$ turns on or off the N-channel MOSFET 31. When the adaptive on-time voltage $V_{AOT}$ is a high-level voltage, the sampling voltage $V_{SAMPLE}$ will maintain at a high-level voltage for a period of time, thereby recording the stable rising slope of the copy voltage $V_{copy}$.

In some embodiments of the invention, the comparison circuit 25 may include an offset voltage source 33, a comparator 34, and an AND gate 35. The negative terminal of the offset voltage source 33 is coupled to the first capacitor 20 and the current mirror 23. The negative input terminal of the comparator 34 is coupled to the positive terminal of the offset voltage source 33 and the positive input terminal of the comparator 34 is coupled to the node between the primary-side switch 16 and the primary side of the first transformer 17. The input terminal of the AND gate 35 is coupled to the output of the comparator 34 and the $\overline{Q}$ output of the SR flip-flop 30. The output of the AND gate 35, coupled to the drive controller 19, generates the detection voltage $V_{DET}$.

The secondary side of the first transformer 17 can be coupled to a synchronous rectifier 36. The synchronous rectifier 36 is coupled to a secondary-side controller 37. The secondary-side controller 37 is coupled to the primary side of a second transformer 38. When the detection voltage $V_{DET}$ maintains at a high-level voltage for a long time, the primary-side switch 16 will also be turned off for a long time, thereby leading to insufficient energy delivered to the secondary side of the first transformer 17. Therefore, the secondary side of the second transformer 38 generates an ask voltage $V_{ASK}$ to shorten the off-time ($t_{off}$) of the primary-side switch 16, thereby increasing the switching frequency of the primary-side switch 16 and decreasing efficiency. The ask voltage $V_{ASK}$ includes positive pulse voltages that periodically appear. In some embodiments of the invention, the control device may further include a maximum allowed switching frequency controller 39. The maximum allowed switching frequency controller 39 is coupled to the drive controller 19, the secondary side of the second transformer 38, and the control terminal of the primary-side switch 16 and is coupled to the ask voltage $V_{ASK}$. In response to the ask voltage $V_{ASK}$, the maximum allowed switching frequency controller 39 drives the drive controller 19 to limit the maximum frequency $F_{req\_max}$ of switching the primary-side switch 16, thus reducing the switching power loss of the primary-side switch 16. The synchronous rectifier 36 is implemented with a field-effect transistor. The secondary-side controller 37 generates a secondary-side gate control voltage $V_{GSEC}$ to turn on or off the synchronous rectifier 36. When the synchronous rectifier 36 is turned on, a leakage current $I_{SEC}$ passes through the synchronous rectifier 36 and the secondary side of the first transformer 17, a forward-biased voltage $V_{forward}$ is generated between the synchronous rectifier 36 and the secondary side of the first transformer 17, and the secondary side of the first transformer 17 generates an output voltage $V_{OUT}$.

Figure 7:
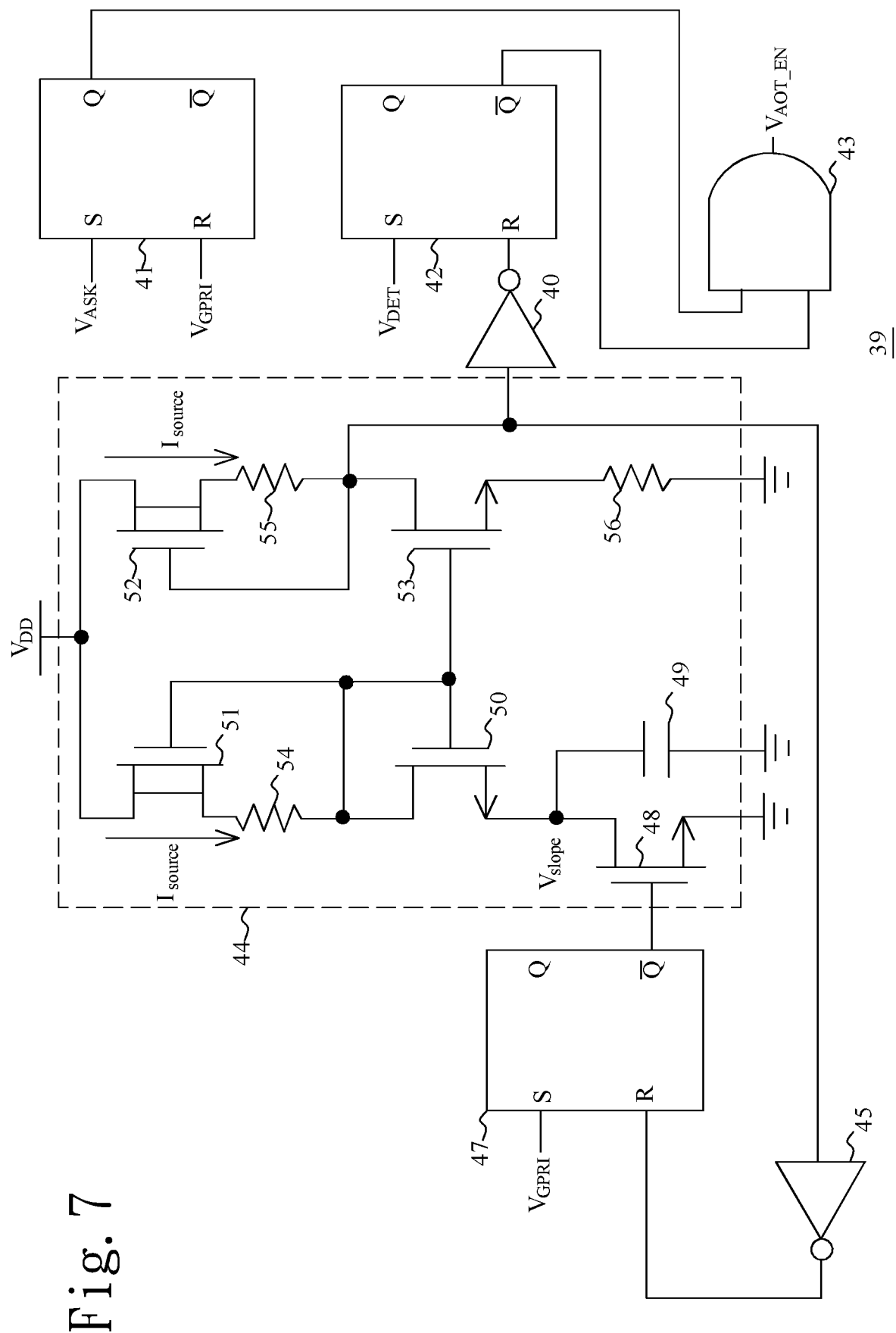
FIG. 7 is a diagram schematically illustrating a maximum allowed switching frequency controller according to an embodiment of the invention.

FIG. 7 is a diagram schematically illustrating a maximum allowed switching frequency controller according to an embodiment of the invention. Referring to FIG. 4, FIG. 5, and FIG. 7, the maximum allowed switching frequency controller 39 may include a first inverter 40, a first SR flip-flop 41, a second SR flip-flop 42, an AND gate 43, a clock generator 44, a second inverter 45, and a third SR flip-flop 47. The S input of the first SR flip-flop 41 is coupled to the secondary side of the second transformer 38 and is also coupled to the ask voltage $V_{ASK}$. The R input of the first SR flip-flop 41 is coupled to the control terminal of the primary-side switch 16 and is also coupled to the primary-side gate control voltage $V_{GPRI}$. The S input of the second SR flip-flop 42 is coupled to the comparison circuit 25 and is also coupled to the detection voltage $V_{DET}$. The R input of the second SR flip-flop 42 is coupled to the output of the first inverter 40. The input of the AND gate 43 is coupled to the Q output of the first SR flip-flop 41 and the Q output of the second SR flip-flop 42. The output of the AND gate 43, coupled to the drive controller 19, generates the enable voltage $V_{AOT\_EN}$. The clock generator 44 is coupled to the supply voltage $V_{DD}$ and the reference voltage and is also coupled to the input of the first inverter 40. The input of the second inverter 45 is coupled to the clock generator 44 and the input of the first inverter 40. The S input of the third SR flip-flop 47 is coupled to the control terminal of the primary-side switch 16 and is also coupled to the primary-side gate control voltage $V_{GPRI}$. The R input of the third SR flip-flop 47 is coupled to the output of the second inverter 45. The output of the third SR flip-flop 47 is coupled to the clock generator 44.

Figure 8:
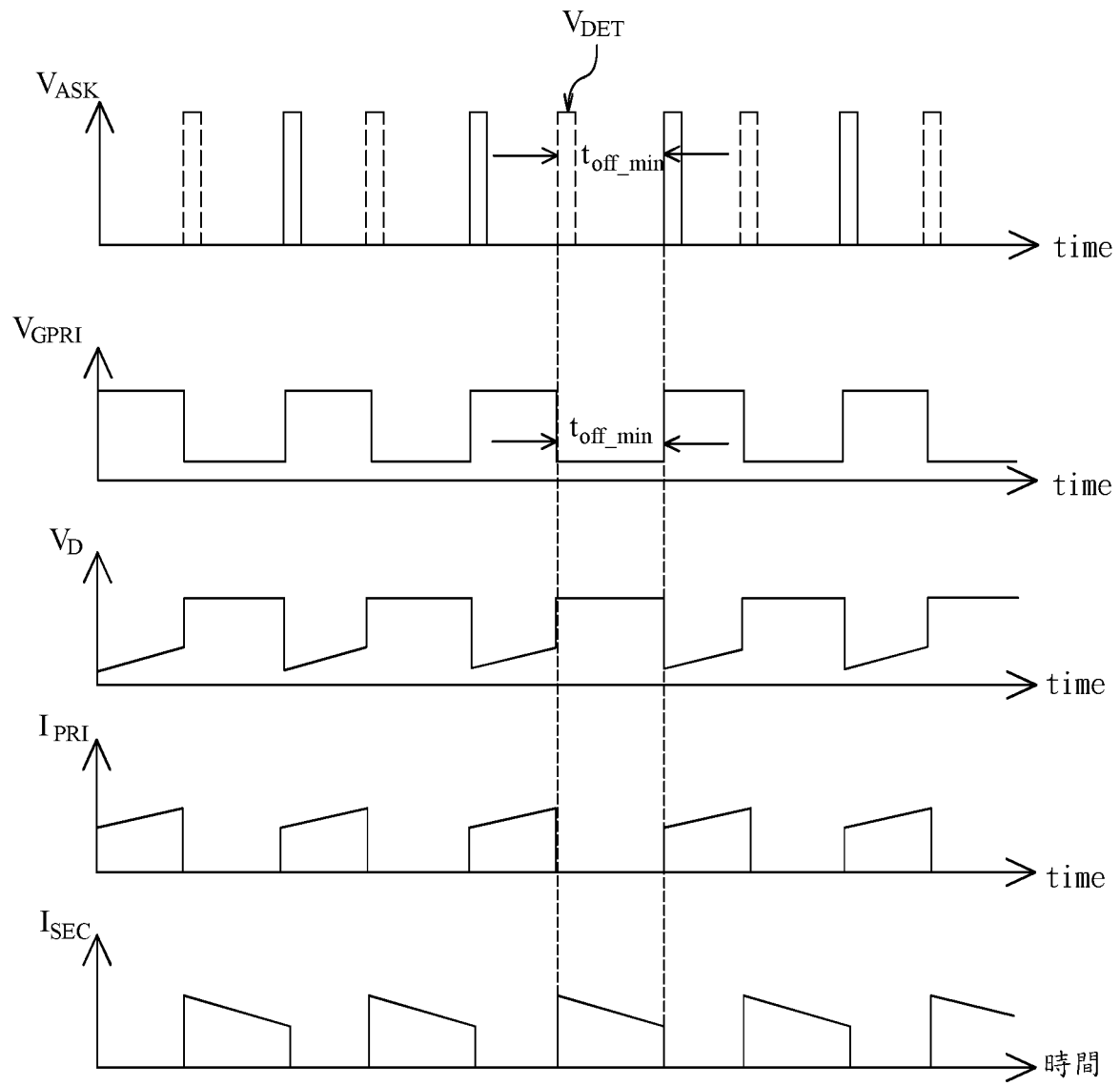
FIG. 8 is a diagram schematically illustrating the waveforms of voltages and currents corresponding to FIG. 7 in detecting the shoot-through phenomenon.

FIG. 8 is a diagram schematically illustrating the waveforms of voltages and currents corresponding to FIG. 7 in detecting the shoot-through phenomenon. Refer to FIG. 4, FIG. 7, and FIG. 8. When the positive pulse voltage of the detection voltage $V_{DET}$ appears, the primary-side gate control voltage $V_{GPRI}$ is a low-level voltage and the node voltage $V_D$ is a high-level voltage. Later, when the positive pulse voltage of the ask voltage $V_{ASK}$ appears, the primary-side gate control voltage $V_{GPRI}$ is a high-level voltage and the node voltage $V_D$ drops abruptly. A time duration between the time points of the two adjacent positive pulse voltages of the detection voltage $V_{DET}$ and the ask voltage $V_{ASK}$ represents the minimum off-time $t_{off\_min}$ of the primary-side switch 16.

Figure 9:
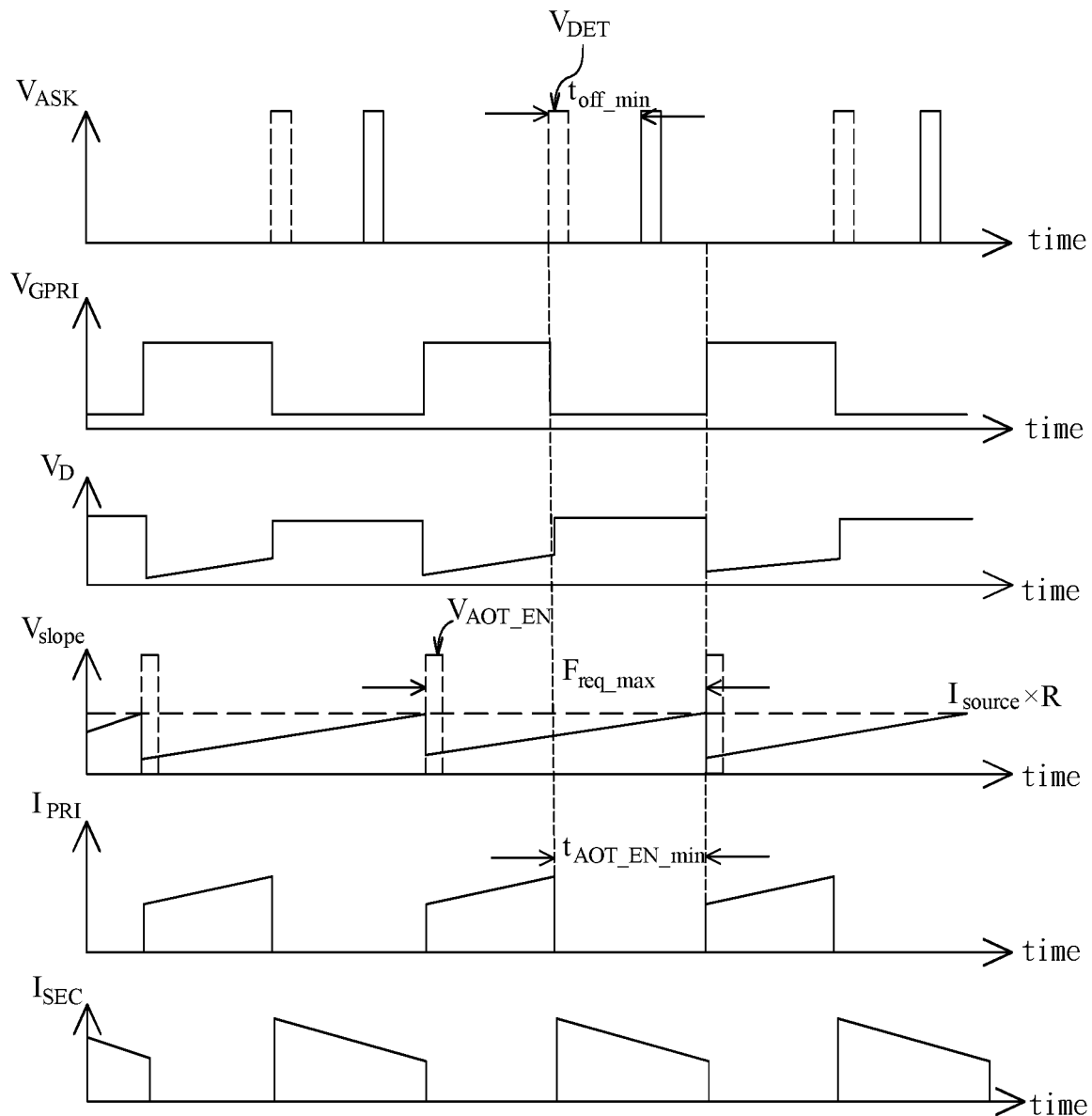
FIG. 9 is a diagram schematically illustrating the waveforms of voltages and currents corresponding to FIG. 7 in limiting the frequency.

FIG. 9 is a diagram schematically illustrating the waveforms of voltages and currents corresponding to FIG. 7 in limiting the frequency. Referring to FIG. 4, FIG. 7, an FIG. 9, the clock generator 44 includes a first N-channel metal-oxide-semiconductor field-effect transistor (MOSFET) 48, a first control capacitor 49, a second N-channel MOSFET 50, a first depletion-mode N-channel MOSFET 51, a second depletion-mode MOSFET 52, a third N-channel MOSFET 53, a first resistor 54, a second resistor 55, and a third resistor 56. The first N-channel MOSFET 48, the second N-channel MOSFET 50, and the third N-channel MOSFET 53 may include, but are not limited to, enhanced-mode GaN-based N-channel MOSFETs. The first depletion-mode N-channel MOSFET 51 and the second depletion-mode MOSFET 52 may include, but are not limited to, depletion-mode GaN-based N-channel MOSFETs. The gate of the first N-channel MOSFET 48 is coupled to the $\overline{Q}$ output of the third SR flip-flop 47. The source of the first N-channel MOSFET 48 is coupled to the reference voltage. One terminal of the first control capacitor 49 is coupled to the reference voltage and another terminal of the first control capacitor 49 is coupled to the drain of the first N-channel MOSFET 48. The source of the second N-channel MOSFET 50 is coupled to one terminal of the first control capacitor 49 and the drain of the first N-channel MOSFET 48. The source of the first depletion-mode N-channel MOSFET 51 is coupled to the drain and the gate of the second N-channel MOSFET 50 and the gate of the first depletion-mode N-channel MOSFET 51 through the first resistor 54. The drain of the first depletion-mode N-channel MOSFET 51 is coupled to the supply voltage $V_{DD}$. The drain of the second depletion-mode MOSFET 52 is coupled to the supply voltage $V_{DD}$. The source of the second depletion-mode MOSFET 52 is coupled to the inputs of the first inverter 40 and the second inverter 45 and the gate of the second depletion-mode MOSFET 52 through the second resistor 55. The gate of the third N-channel MOSFET 53 is coupled to the gate of the second N-channel MOSFET 50. The drain of the third N-channel MOSFET 53 is coupled to the second resistor 55, the gate of the second depletion-mode MOSFET 52, and inputs of the first inverter 40 and the second inverter 45. The source of the third N-channel MOSFET 53 is coupled to the reference voltage through the third resistor 56. A source current $I_{source}$ passes through the first depletion-mode N-channel MOSFET 51 and the first resistor 54 and another source current $I_{source}$ passes through the second depletion-mode MOSFET 52 and the second resistor 55. The source current $I_{source}$ charges the first control capacitor 49 to generate a ramp-up voltage $V_{slope}$.

When the positive pulse voltage of the detection voltage $V_{DET}$ appears, the primary-side gate control voltage $V_{GPRI}$ is a low-level voltage and the node voltage $V_D$ is a high-level voltage. Subsequently, when the positive pulse voltage of the ask voltage $V_{ASK}$ appears, the ramp-up voltage $V_{slope}$ remains less than $I_{source} \times R$. This indicates that turning on the primary-side switch 16 at this time point would result in too high a switching frequency. R represents the resistance of the third resistor 56. When the ramp-up voltage $V_{slope}$ exceeds $I_{source} \times R$ and the output of the second SR flip-flop 42 outputs a high-level voltage, the enable voltage $V_{AOT\_EN}$ is a high-level voltage and the primary-side switch 16 is turned on. Therefore, when the enable voltage $V_{AOT\_EN}$ is a high-level voltage, the primary-side gate control voltage $V_{GPRI}$ is a high-level voltage and the node voltage $V_D$ drops abruptly. A time duration between the time periods of the two adjacent positive pulse voltages of the detection voltage $V_{DET}$ and the ask voltage $V_{ASK}$ is defined as the minimum off time $t_{off\_min}$ of the primary-side switch 16. The enable voltage $V_{AOT\_EN}$ also includes positive pulse voltages that periodically appear. A time duration between the time points of the two adjacent positive pulse voltages of the detection voltage $V_{DET}$ and the enable voltage $V_{AOT\_EN}$ is defined as the minimum enable time $t_{AOT\_EN\_min}$ of the primary-side switch 16. Even if the ask voltage $V_{ASK}$ drives the Q output of the first SR flip-flop 41 to output a high-level voltage to define the minimum off time $t_{off\_min}$, the minimum enable time $t_{AOT\_EN\_min}$ is still greater than the minimum off time $t_{off\_min}$. The primary side switch 16 is actually turned off for the minimum enable time $t_{AOT\_EN\_min}$. In other words, the maximum allowed switching frequency controller 39 drives the drive controller 19 to switch the primary-side switch 16 at the maximum frequency $F_{req\_max}$, thereby reducing the switching power loss of the primary-side switch 16. For example, the maximum frequency $F_{req\_max}$ is equal to $(RC)^{-1}$, where C is the capacitance of the first control capacitor 49. It is worth noting that when the voltage of the input of the second inverter 45 transitions from a low-level voltage to a high-level voltage, a glitch-like signal is transmitted to the R input of the third SR flip-flop 47, such that the output of the third SR flip-flop 47 generates a high-level voltage to discharge the first control capacitor 49.

Figure 10:
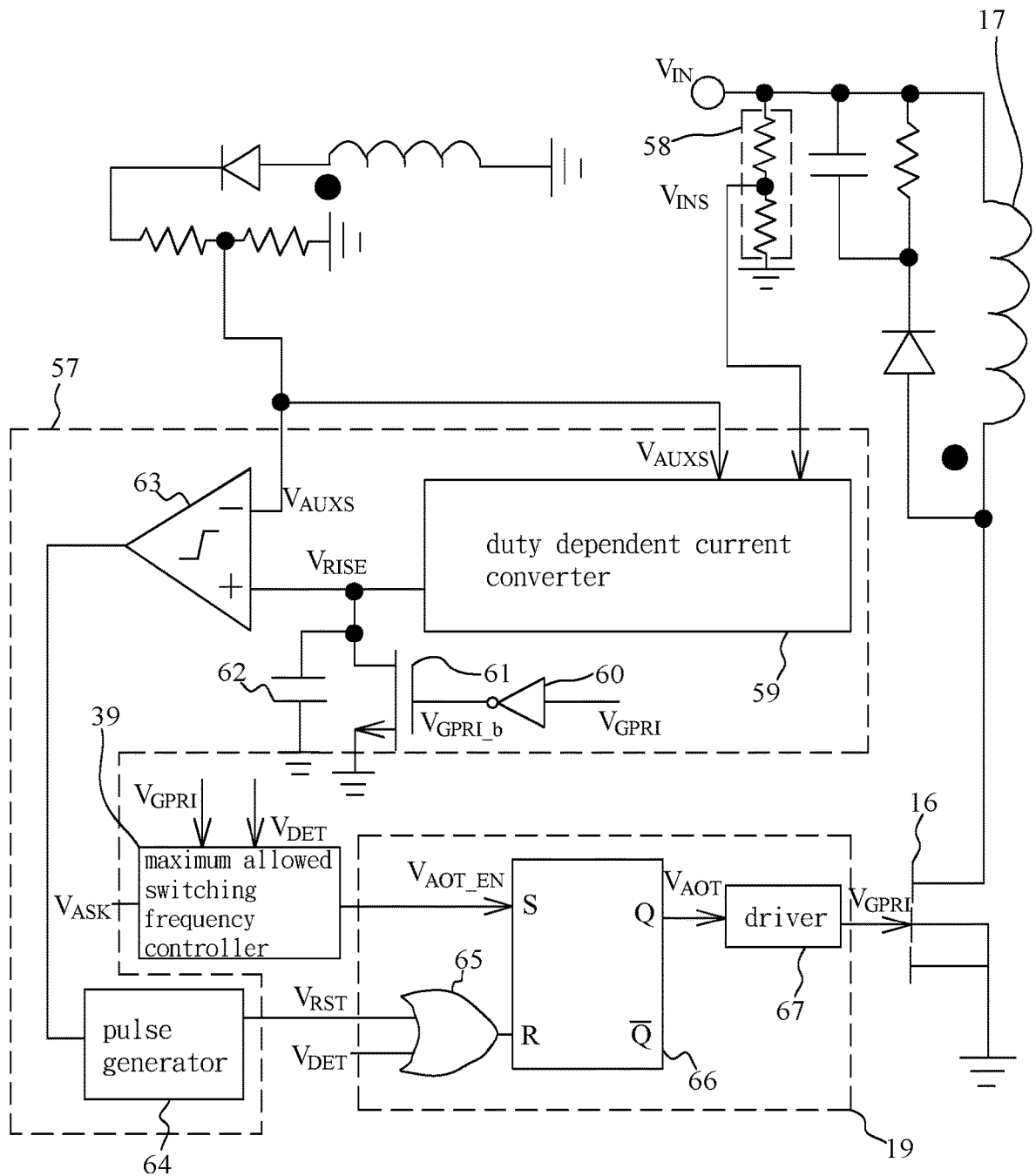
FIG. 10 is a diagram schematically illustrating a drive controller and a maximum allowed switching frequency controller according to an embodiment of the invention.
Figure 11:
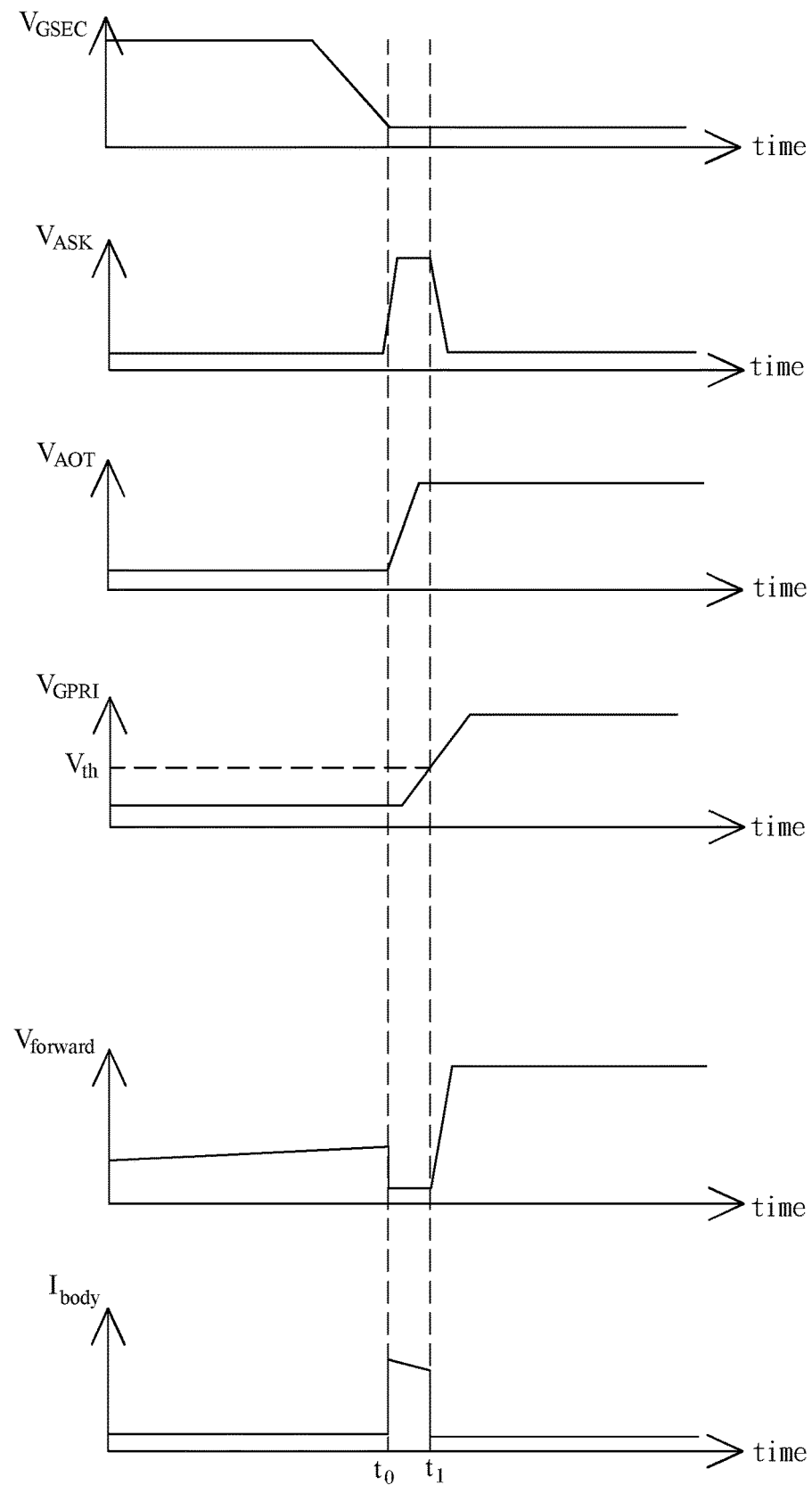
FIG. 11 is a diagram schematically illustrating the waveforms of voltages and currents corresponding to FIG. 10.

FIG. 10 is a diagram schematically illustrating a drive controller and a maximum allowed switching frequency controller according to an embodiment of the invention. FIG. 11 is a diagram schematically illustrating the waveforms of voltages and currents corresponding to FIG. 10. Refer to FIG. 10 and FIG. 11. In some embodiments of the invention, the control device may further include a voltage dependent controller 57. The first transformer 17 further includes an auxiliary side. The primary side of the first transformer 17 is coupled to a voltage divider 58, which is configured to generate a dependent voltage $V_{INS}$ based on the input voltage $V_{IN}$. The auxiliary side is configured to generate an auxiliary voltage $V_{AUXS}$. The voltage dependent controller 57 is coupled to the drive controller 19, the auxiliary side, and the voltage divider 58 and coupled to the primary-side gate control voltage $V_{GPRI}$, the dependent voltage $V_{INS}$, and the auxiliary voltage $V_{AUXS}$. The voltage dependent controller 57 is configured to generate a reset voltage $V_{RST}$ based on the dependent voltage $V_{INS}$ and the auxiliary voltage $V_{AUXS}$ and transmit the reset voltage $V_{RST}$ to the drive controller 19.

The voltage dependent controller 57 may include a duty dependent current converter 59, a third inverter 60, a fourth N-channel metal-oxide-semiconductor field-effect transistor (MOSFET) 61, a second control capacitor 62, a comparator 63, and a pulse generator 64. The fourth N-channel MOSFET 61 includes, but is not limited to, an enhanced-mode GaN-based N-channel MOSFET. The duty dependent current converter 59 is coupled to the voltage divider 58 and the auxiliary side and coupled to the auxiliary voltage $V_{AUXS}$ and the dependent voltage $V_{INS}$. The duty dependent current converter 59 generates a conversion voltage $V_{RISE}$ based on the auxiliary voltage $V_{AUXS}$ and the dependent voltage $V_{INS}$. The input of the third inverter 60 is coupled to the control terminal of the primary-side switch 16. The gate of the fourth N-channel MOSFET 61 is coupled to the output of the third inverter 60. The source of the fourth N-channel MOSFET 61 is coupled to the reference voltage. The drain of the fourth N-channel MOSFET 61 is coupled to the duty dependent current converter 59 and coupled to the conversion voltage $V_{RISE}$. One terminal of the second control capacitor 62 is coupled to the reference voltage and another terminal of the second control capacitor 62 is coupled to the drain of the fourth N-channel MOSFET 61 and coupled to the conversion voltage $V_{RISE}$. The negative input of the comparator 63 is coupled to the auxiliary side and coupled to the auxiliary voltage $V_{AUXS}$. The positive input of the comparator 63 is coupled to the duty dependent current converter 59 and coupled to the conversion voltage $V_{RISE}$. The pulse generator 64 is coupled to the output of the comparator 63 and the drive controller 19 and configured to generate the reset voltage $V_{RST}$.

The drive controller 19 may include an OR gate 65, a fourth SR flip-flop 66, and a driver 67. The input of the OR gate 65 is coupled to the pulse generator 64 and the AND gate 35 in the comparison circuit 25 of FIG. 5 and coupled to the reset voltage $V_{RST}$. The S input of the fourth SR flip-flop 66 is coupled to the AND gate 43 in FIG. 7 and coupled to the enable voltage $V_{AOT\_EN}$. The R input of the fourth SR flip-flop 66 is coupled to the output of the OR gate 65. The Q output of the fourth SR flip-flop 66, coupled to the delayer 29 in the sample-and-hold circuit 24 of FIG. 5, outputs the adaptive on-time voltage $V_{AOT}$. The driver 67 is coupled to the input of the third inverter 60, the Q output of the fourth SR flip-flop 66, the control terminal of the primary-side switch 16, the input of the inverter INV in FIG. 5, and the R input of the first SR flip-flop 41 and the S input of the third SR flip-flop 47 in FIG. 7.

After time point $t_0$, the secondary-side gate control voltage $V_{GSEC}$ is a low-level voltage and the ask voltage $V_{ASK}$ is a positive pulse voltage, such that the adaptive on-time voltage $V_{AOT}$ and the primary-side gate control voltage $V_{GPRI}$ gradually increase, the forward-biased voltage $V_{forward}$ abruptly decreases, and the body current $I_{body}$ abruptly increases. The body current $I_{body}$ is the current passing through the base of the field-effect transistor used as the synchronous rectifier 36 in FIG. 4. At time point $t_1$, the primary-side gate control voltage $V_{GPRI}$ is equal to the threshold voltage $V_{th}$ of the primary-side switch 16. When the primary-side gate control voltage $V_{GPRI}$ is greater than the threshold voltage $V_{th}$ of the primary-side switch 16, the forward-biased voltage $V_{forward}$ gradually increases and the body current $I_{body}$ abruptly decreases. Because the body current $I_{body}$ only appears between time points $t_0$ and $t_1$, the power loss is very small.

Figure 12:
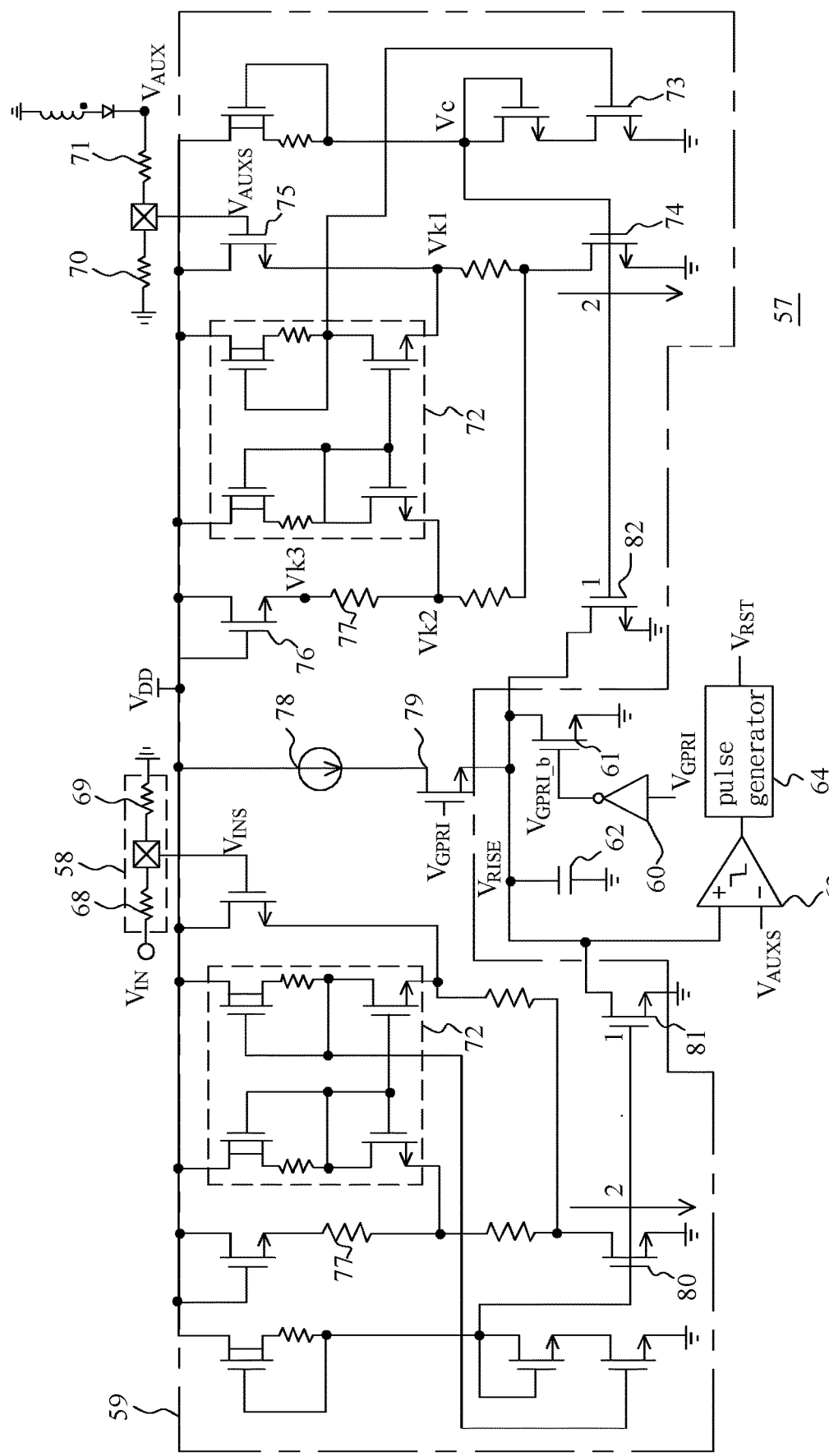
FIG. 12 is a diagram schematically illustrating a maximum allowed switching frequency controller according to an embodiment of the invention.
Figure 13:
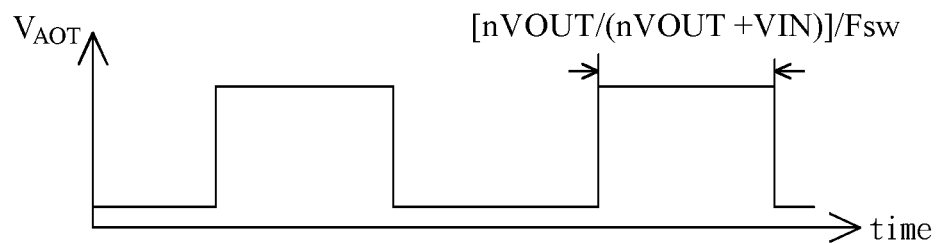
FIG. 13 is a diagram schematically illustrating the waveforms of voltages and currents corresponding to FIG. 12.
Figure 13:
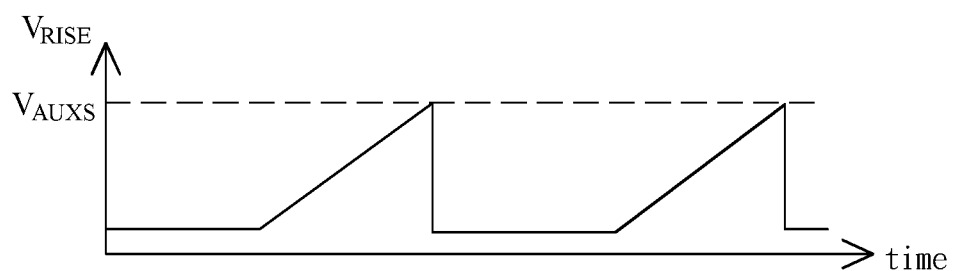
Figure 13:
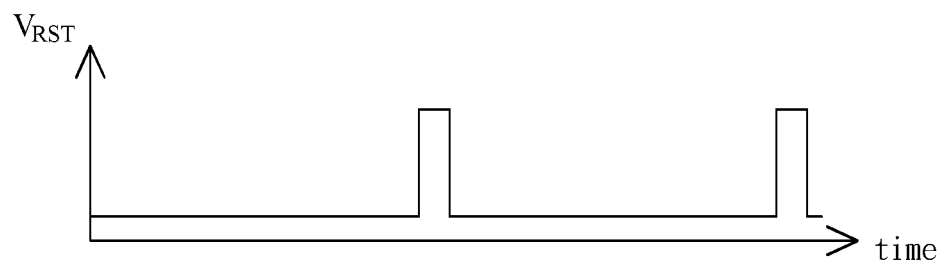

FIG. 12 is a diagram schematically illustrating a maximum allowed switching frequency controller according to an embodiment of the invention. FIG. 13 is a diagram schematically illustrating the waveforms of voltages and currents corresponding to FIG. 12. Please refer to FIG. 12 and FIG. 13. The maximum allowed switching frequency controller 57 includes, but is not limited to, depletion-mode and enhancement-mode N-channel GaN-based field-effect transistors. The voltage divider 58 includes two resistors 68 and 69. The auxiliary voltage $V_{AUXS}$ is generated between resistors 70 and 71. The common-gate operational amplifier 72 controls the gate of the field-effect transistor 73 to derive the node voltage Vc, such that the node voltages Vk1 and Vk2 are equal, thereby defining the tail current of the field-effect transistor 74 in turn. Due to virtual short between the two nodes with node voltages Vk1 and Vk2, the currents passing through the field-effect transistors 75 and 76 are almost equal. Additionally, the currents passing through the field-effect transistors 75 and 76 will be respectively set to $\{Vk3-Vk1\}/Rk$ and $\{V_{DD}-[R4\times V_{AUX}/(R3+R4)]\}/Rk$, where Vk3 represents the source voltage of the field-effect transistor 76, $V_{AUX}$ represents the voltage generated by the auxiliary side, $V_{AUXS}$ represents the partial voltage of $V_{AUX}$, R3 represents the resistance of the resistor 71, R4 represents the resistance of the resistor 70, and Rk represents the resistance of a resistor 77. The current of a current source 78 is represented by $2V_{DD}/Rk$. The gate of field-effect transistor 79 is coupled to the driver 67 of the drive controller 19 in FIG. 10 and coupled to the primary-side gate control voltage $V_{GPRI}$. The current passing through a field-effect transistor 80 is equal to $2[V_{DD}-R2/(R1+R2)V_{IN}]/Rk$, where R1 represents the resistance of the resistor 68 and R2 represents the resistance of resistor 69. The current passing through the field-effect transistor 74 is equal to $2[V_{DD}-R4/(R3+R4)V_{AUX}]/Rk$. Since the mirror ratio is 2:1, the currents passing through the field-effect transistors 81 and 82 are half of the currents passing through the field-effect transistors 80 and 74, respectively. Therefore, the conversion voltage $V_{RISE}$ is equal to $[2V_{DD}/Rk-(I1-I2)]/C1$, which is equivalent to $[R2/(R1+R2)V_{IN}+R4/(R3+R4)V_{AUX}]/(Rk\times C1)$, where I1 represents the current passing through the field-effect transistor 82, I2 represents the current passing through the field-effect transistor 81, and C1 represents the capacitance of the second control capacitor 62. Finally, when the conversion voltage $V_{RISE}$ exceeds the auxiliary voltage $V_{AUXS}$, the reset voltage $V_{RST}$ is set to a high-level voltage, thereby transitioning the adaptive on-time voltage $V_{AOT}$ from a high-level voltage to a low-level voltage and turning off the drive controller 19 in FIG. 10. The on-time can be set to $[n V_{OUT}/(n V_{OUT}+V_{IN})]/Fsw$, which is equivalent to the duty cycle of the flyback converter, where n represents a positive integer and Fsw represents the switching frequency of the primary-side switch. Fsw will be fixed in case of any voltage fluctuations.

Figure 14:
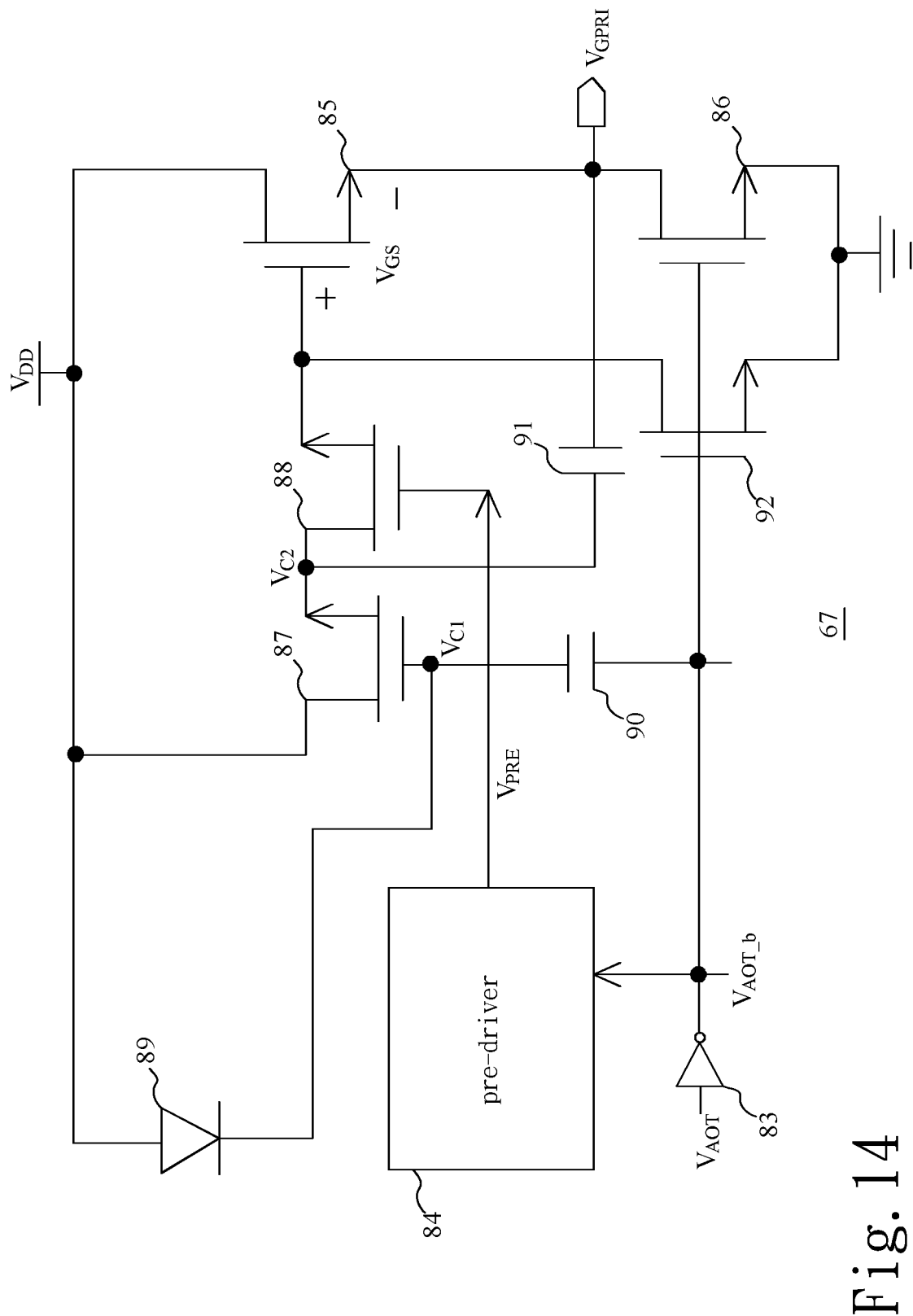
FIG. 14 is a diagram schematically illustrating a driver according to an embodiment of the invention.
Figure 15:
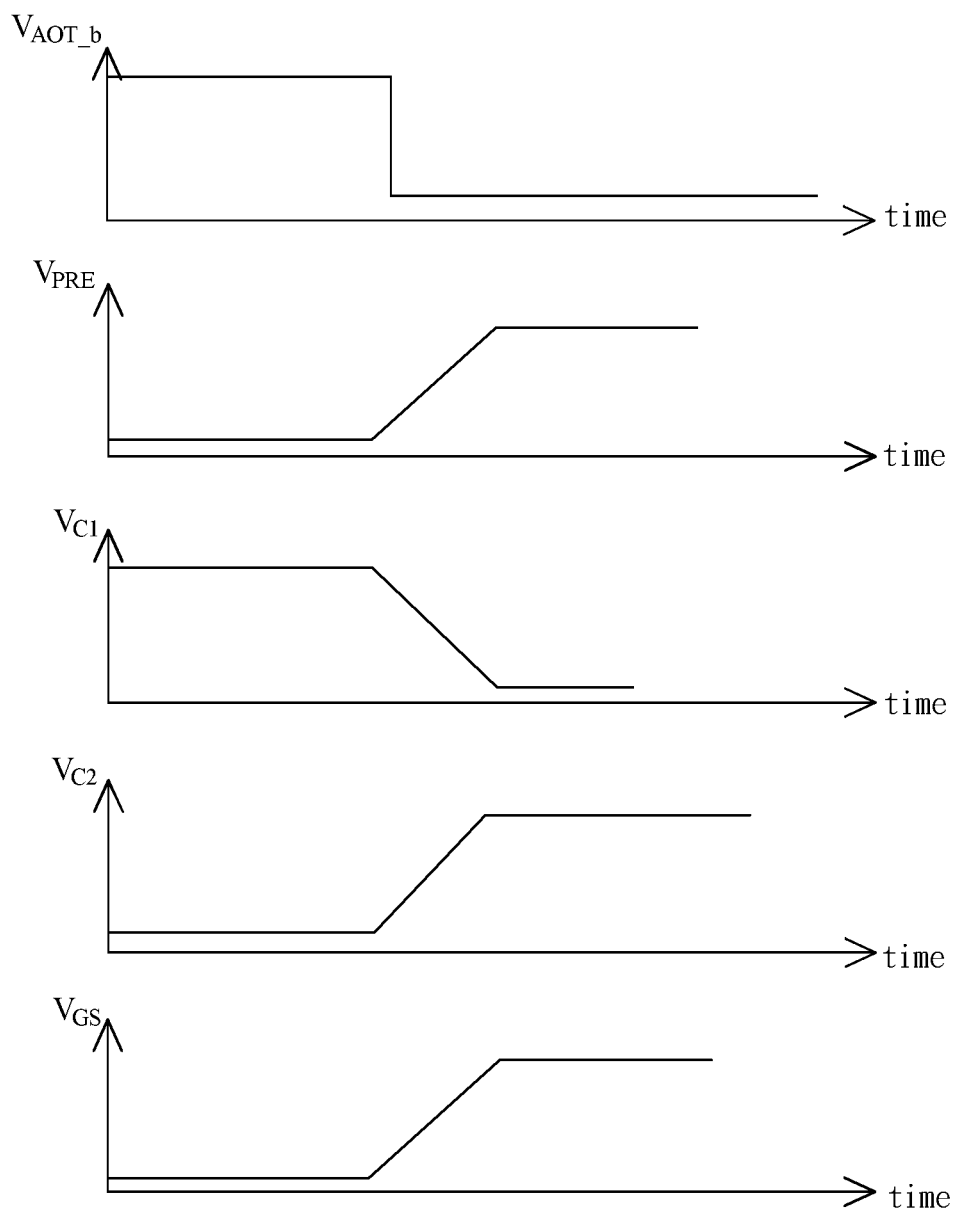
FIG. 15 is a diagram schematically illustrating the waveforms of voltages and currents corresponding to FIG. 14.

FIG. 14 is a diagram schematically illustrating a driver according to an embodiment of the invention. FIG. 15 is a diagram schematically illustrating the waveforms of voltages and currents corresponding to FIG. 14. Please refer to FIG. 14 and FIG. 15. The driver 67 includes a fourth inverter 83, a pre-driver 84, a fifth N-channel field-effect transistor 85, a sixth N-channel field-effect transistor 86, a seventh N-channel field-effect transistor 87, an eighth N-channel field-effect transistor 88, a diode 89, a first driving capacitor 90, a second driving capacitor 91, and a ninth N-channel field-effect transistor 92. The fifth N-channel field-effect transistor 85, the sixth N-channel field-effect transistor 86, the seventh N-channel field-effect transistor 87, the eighth N-channel field-effect transistor 88, and the ninth N-channel field-effect transistor 92 can be, but not limited to, enhancement-mode GaN-based N-channel field-effect transistors. The input of the fourth inverter 83 is coupled to the Q output of the fourth SR flip-flop 66 in FIG. 10. The output of the fourth inverter 83 is coupled to the pre-driver 84. The fifth N-channel field-effect transistor 85 and the sixth N-channel field-effect transistor 86 are coupled in series and coupled between the supply voltage $V_{DD}$ and the reference voltage. The control terminal of the primary-side switch 16 in FIG. 10, the gate of the field-effect transistor 79 in FIG. 12, the input of the third inverter 60 in FIG. 10, the input of the inverter INV in FIG. 5, the R input of the first SR flip-flop 41 in FIG. 7, and the S input of the third SR flip-flop 47 in FIG. 7 are coupled to the node between the fifth N-channel field-effect transistor 85 and the sixth N-channel field-effect transistor 86. The seventh N-channel field-effect transistor 87 and the eighth N-channel field-effect transistor 88 are coupled in series and coupled between the gate of the fifth N-channel field-effect transistor 85 and the supply voltage $V_{DD}$. The gate of the eighth N-channel field-effect transistor 88 is coupled to the pre-driver 84. The anode of the diode 89 is coupled to the supply voltage $V_{DD}$ and the cathode of the diode 89 is coupled to the gate of the seventh N-channel field-effect transistor 87. One terminal of the first driving capacitor 90 is coupled to the gate of the seventh N-channel field-effect transistor 87 and another terminal of the first driving capacitor 90 is coupled to the output of the fourth inverter 83. One terminal of the second driving capacitor 91 is coupled between the seventh N-channel field-effect transistor 87 and the eighth N-channel field-effect transistor 88 and another terminal of the second driving capacitor 91 is coupled to the control terminal of the primary-side switch 16 in FIG. 10. The ninth N-channel field-effect transistor 92 is coupled between the gate of the fifth N-channel field-effect transistor 85 and the reference voltage. The gates of the ninth N-channel field-effect transistor 92 and the sixth N-channel field-effect transistor 86 are coupled to the output of the fourth inverter 83.

At time point $t_0$, the input of the fourth inverter 83 is coupled to the adaptive on-time voltage $V_{AOT}$ and the fourth inverter 83 outputs the inverted adaptive on-time voltage $V_{AOT\_b}$. The pre-driver 84, coupled to the inverted adaptive on-time voltage $V_{AOT\_b}$, outputs a pre-drive voltage $V_{PRE}$. The node between the fifth N-channel field-effect transistor 85 and the sixth N-channel field-effect transistor 86 outputs the primary-side gate control voltage $V_{GPRI}$. When the inverted adaptive on-time voltage $V_{AOT\_b}$ is a low-level voltage, the first driving capacitor 90 stores $V_{DD}$-$V_D$. When the inverted adaptive on-time voltage $V_{AOT\_b}$ transitions from a low-level voltage to a high-level voltage, the node voltage $V_{C1}$ rises to $2V_{DD}$-$V_D$, and the seventh N-channel field-effect transistor 87 is fully turned on, charging the node with voltage $V_{C2}$ to $V_{DD}$. When the inverted adaptive on-time voltage $V_{AOT\_b}$ transitions from a high-level voltage to a low-level voltage, the pre-driver 84 drives the pre-drive voltage $V_{PRE}$ to rise to $3V_{DD}$-$2V_D$ and turns on the eighth N-channel field-effect transistor 88. As a result, the gate-source voltage $V_{GS}$ of the fifth N-channel field-effect transistor 85 maintains at $V_{DD}$, thereby increasing the charging capacity without being affected by the node voltage $V_D$.

According to the embodiments provided above, the control device employs the sample-and-hold circuit to record the rising slope of the copy voltage across the first capacitor, thereby turning off the primary-side switch. Thus, the shoot-through phenomenon of the primary-side switch is avoided.

The embodiments described above are only to exemplify the invention and not to limit the scope of the invention. Therefore, any equivalent modification or variation according to the shapes, structures, features, or spirit disclosed by the invention is to be also included within the scope of the invention.

What is claimed is:

1. A control device coupled to a control terminal of a primary-side switch, the primary-side switch coupled to a primary side of a first transformer in series, and the control device comprising:

a first capacitor;

a drive controller coupled to the control terminal of the primary-side switch;

a constant current source coupled to the first capacitor and configured to generate a constant current;

a discharge-controlled current source coupled to the constant current source and the first capacitor;

a current mirror coupled to a node between the first capacitor and the primary side of the primary-side switch and configured to generate a copy current based on a node voltage of the node, wherein the copy current is configured to charge the first capacitor to generate a copy voltage across the first capacitor;

a sample-and-hold circuit coupled to the drive controller, the discharge-controlled current source, and the current mirror, wherein when the drive controller turns on the primary-side switch, the sample-and-hold circuit drives the discharge-controlled current source to sample and hold a control current from the constant current and the copy current; and a comparison circuit coupled to the drive controller, the sample-and-hold circuit, the node, and the first capacitor and coupled to the node voltage and the copy voltage, wherein when the node voltage is higher than the copy voltage, the comparison circuit drives the drive controller to turn off the primary-side switch.

2. The control device according to claim 1, wherein the sample-and-hold circuit comprises:

a delayer coupled to the drive controller;

a SR flip-flop with a S input thereof coupled to the drive controller, and a R input of the SR flip-flop is coupled to the delayer;

an N-channel metal-oxide-semiconductor field-effect transistor (NMOSFET) with a gate thereof coupled to a Q output of the SR flip-flop, and the NMOSFET is coupled between the current mirror and the discharge-controlled current source; and a second capacitor with one terminal thereof coupled to the NMOSFET and the discharge-controlled current source, and another terminal of the second capacitor is coupled to a reference voltage.

3. The control device according to claim 2, wherein the comparison circuit comprises:

an offset voltage source with a negative terminal thereof coupled to the first capacitor and the current mirror;

a comparator with a negative input coupled to a positive terminal of the offset voltage source, and a positive input of the comparator is coupled to the node; and an AND gate with an input thereof coupled to an output of the comparator and a $\overline{Q}$ output of the SR flip-flop, and an output of the AND gate is coupled to the drive controller.

4. The control device according to claim 1, further comprising a maximum allowed switching frequency controller, a secondary side of the first transformer is coupled to a synchronous rectifier, the synchronous rectifier is coupled to a secondary controller, the secondary controller is coupled to a primary side of a second transformer, a secondary side of the second transformer is configured to generate an ask voltage, and the maximum allowed switching frequency controller is coupled to the drive controller, the secondary side of the second transformer, and the control terminal of the primary-side switch and coupled to the ask voltage, thereby driving the drive controller to limit a maximum frequency of the primary-side switch.

5. The control device according to claim 4, wherein the maximum allowed switching frequency controller comprises:

a first inverter;
a first SR flip-flop with a S input thereof coupled to the secondary side of the second transformer and coupled to the ask voltage, a R input of the first flip-flop is coupled to the control terminal of the primary-side switch;
a second SR flip-flop with a S input thereof coupled to the comparison circuit, and a R input of the second SR flip-flop is coupled to an output of the first inverter;
an AND gate with an input thereof coupled to a Q output of the first SR flip-flop and a $\overline{Q}$ output of the second SR flip-flop, and an output of the AND gate is coupled to the drive controller;
a clock generator coupled to a supply voltage and a reference voltage and coupled to an input of the first inverter;
a second inverter with an input thereof coupled to the clock generator and the input of the first inverter; and
a third SR flip-flop with a S input thereof coupled to the control terminal of the primary-side switch, a R input of the third SR flip-flop is coupled to an output of the second inverter, and a $\overline{Q}$ output of the third SR flip-flop is coupled to the clock generator.

6. The control device according to claim 5, wherein the clock generator comprises:
a first N-channel metal-oxide-semiconductor field-effect transistor (NMOSFET) with a gate thereof coupled to the Q output of the third SR flip-flop, and a source of the first NMOSFET is coupled to the reference voltage;
a first control capacitor with one terminal thereof coupled to the reference voltage, and another terminal of the first control capacitor is coupled to a drain of the first NMOSFET;
a second N-channel metal-oxide-semiconductor field-effect transistor (NMOSFET) with a source thereof coupled to the first control capacitor and the drain of the first NMOSFET;
a first depletion-mode N-channel metal-oxide-semiconductor field-effect transistor (NMOSFET) with a source thereof coupled to a drain and a gate of the second NMOSFET and a gate of the first depletion-mode NMOSFET through a first resistor, and a drain of the first depletion-mode NMOSFET is coupled to the supply voltage;
a second depletion-mode N-channel metal-oxide-semiconductor field-effect transistor (NMOSFET) with a drain thereof coupled to the supply voltage, and a source of the second depletion-mode NMOSFET is coupled to the inputs of the first inverter and the second inverter and a gate of the second depletion-mode NMOSFET through a second resistor; and
a third N-channel metal-oxide-semiconductor field-effect transistor (NMOSFET) with a gate thereof coupled to the gate of the second NMOSFET, a drain of the third NMOSFET is coupled to the second resistor, the gate of the second depletion-mode NMOSFET, and the inputs of the first inverter and the second inverter, and a source of the third NMOSFET is coupled to the reference voltage through a third resistor.

7. The control device according to claim 6, wherein the maximum frequency is equal to $(RC)^{-1}$, C represents a capacitance of the first control capacitor, and R represents a resistance of the third resistor.

8. The control device according to claim 6, further comprising a voltage dependent controller, the first transformer further comprises an auxiliary side, the primary side of the first transformer is coupled to a voltage divider and coupled to an input voltage, the voltage divider is configured to generate a dependent voltage based on the input voltage, the auxiliary side is configured to generate an auxiliary voltage, the voltage dependent controller is coupled to the drive controller, the auxiliary side, and the voltage divider and coupled to the dependent voltage and the auxiliary voltage, and the voltage dependent controller is configured to generate a reset voltage based on the dependent voltage and the auxiliary voltage and transmit the reset voltage to the drive controller.

9. The control device according to claim 8, wherein the voltage dependent controller comprises:
a duty dependent current converter coupled to the voltage divider and the auxiliary side and coupled to the auxiliary voltage and the dependent voltage, and the duty dependent current converter is configured to generate a conversion voltage based on the auxiliary voltage and the dependent voltage;
a third inverter with an input thereof coupled to the control terminal of the primary-side switch;
a fourth N-channel metal-oxide-semiconductor field-effect transistor (NMOSFET) with a gate thereof coupled to an output of the third inverter, a source of the fourth NMOSFET is coupled to the reference voltage, and a drain of the fourth NMOSFET is coupled to the duty dependent current converter and coupled to the conversion voltage;
a second control capacitor with one terminal thereof coupled to the reference voltage, and another terminal of the second control capacitor is coupled to the drain of the fourth NMOSFET and coupled to the conversion voltage;
a comparator with a negative terminal thereof coupled to the auxiliary side and coupled to the auxiliary voltage, and a positive terminal of the comparator is coupled to the duty dependent current converter and coupled to the conversion voltage; and
a pulse generator coupled to an output of the comparator and drive controller and configured to generate the reset voltage.

10. The control device according to claim 9, wherein the drive controller comprises:
an OR gate with an input thereof coupled to the pulse generator and the comparison circuit and coupled to the reset voltage;
a fourth SR flip-flop with a S input thereof coupled to the OR gate, a R input of the fourth SR flip-flop is coupled to an output of the OR gate, and a Q output of the fourth SR flip-flop is coupled to the sample-and-hold circuit; and
a driver coupled to the input of the third inverter, the Q output of the fourth SR flip-flop, the control terminal of the primary-side switch, the R input of the first SR flip-flop, and the S input of the third SR flip-flop.

11. The control device according to claim 10, wherein the driver comprises:
a fourth inverter with an input thereof coupled to the Q output of the fourth SR flip-flop;
a pre-driver coupled to an output of the fourth inverter;
a fifth N-channel metal-oxide-semiconductor field-effect transistor (NMOSFET) and a sixth N-channel metal-oxide-semiconductor field-effect transistor (NMOSFET) coupled in series and coupled between the supply voltage and the reference voltage, the control terminal of the primary-side switch is coupled between the fifth NMOSFET and the sixth NMOSFET;

a seventh N-channel metal-oxide-semiconductor field-effect transistor (NMOSFET) and an eighth N-channel metal-oxide-semiconductor field-effect transistor (NMOSFET) coupled in series and coupled between a gate of the fifth NMOSFET and the supply voltage, and the eighth NMOSFET is coupled to the pre-driver;

a diode with an anode thereof coupled to the supply voltage, and a cathode of the diode is coupled to a gate of the seventh NMOSFET;

a first driving capacitor with one terminal thereof coupled to the gate of the seventh NMOSFET, and another terminal of the first driving capacitor is coupled to the output of the fourth inverter;

a second driving capacitor with one terminal thereof coupled between the seventh NMOSFET and the eighth NMOSFET, and another terminal of the second driving capacitor is coupled to the control terminal of the primary-side switch; and a ninth N-channel metal-oxide-semiconductor field-effect transistor (NMOSFET) coupled between the gate of the fifth NMOSFET and the reference voltage, and gates of the ninth NMOSFET and the sixth NMOSFET are coupled to the output of the fourth inverter.

12. The control device according to claim 1, further comprising a depletion-mode N-channel metal-oxide-semiconductor field-effect transistor (NMOSFET) with one terminal thereof coupled to the comparison circuit and the current mirror, the depletion-mode NMOSFET is coupled between the node and the comparison circuit, and the depletion-mode NMOSFET is turned on.

* * * * *